(12) United States Patent
Mitsuyoshi et al.

(10) Patent No.: US 11,459,476 B2
(45) Date of Patent: Oct. 4, 2022

(54) PRODUCTION METHOD FOR PIGMENT AQUEOUS DISPERSION

(71) Applicant: KAO CORPORATION, Tokyo (JP)

(72) Inventors: Kaname Mitsuyoshi, Kinokawa (JP); Tsuyoshi Egawa, Izumiotsu (JP); Tomohiko Nagano, Wakayama (JP); Yusuke Shimizu, Misaki-cho (JP)

(73) Assignee: KAO CORPORATION, Tokyo (JP)

( * ) Notice: Subject to any disclaimer, the term of this patent is extended or adjusted under 35 U.S.C. 154(b) by 320 days.

(21) Appl. No.: 16/764,571

(22) PCT Filed: Dec. 20, 2018

(86) PCT No.: PCT/JP2018/047084
§ 371 (c)(1),
(2) Date: May 15, 2020

(87) PCT Pub. No.: WO2019/131455
PCT Pub. Date: Jul. 4, 2019

(65) Prior Publication Data
US 2020/0392361 A1  Dec. 17, 2020

(30) Foreign Application Priority Data
Dec. 27, 2017 (JP) .............................. JP2017-252515

(51) Int. Cl.
*C09D 17/00* (2006.01)
*B41M 5/00* (2006.01)
(Continued)

(52) U.S. Cl.
CPC ......... *C09D 17/003* (2013.01); *B41M 5/0023* (2013.01); *C09B 55/001* (2013.01);
(Continued)

(58) Field of Classification Search
CPC ... C09D 11/107; C09D 11/322; C09D 11/033; C09D 11/326; C09D 11/106;
(Continued)

(56) References Cited

U.S. PATENT DOCUMENTS 6,284,029 B1  8/2001  Sano et al.
8,580,025 B2 * 11/2013  Tateishi ................. C09D 11/40
106/31.77

(Continued)

FOREIGN PATENT DOCUMENTS

CN  101243145 A  8/2008
CN  102257080 A  11/2011

(Continued)

OTHER PUBLICATIONS

Partial Supplementary European Search Report for European Application No. 18694113.2, dated Sep. 2, 2021.

(Continued)

*Primary Examiner* — An H Do
(74) *Attorney, Agent, or Firm* — Birch, Stewart, Kolasch & Birch, LLP

(57) ABSTRACT

The present invention relates to [1] a process for producing a pigment water dispersion liquid of polymer particles containing an azomethine metal complex pigment (A), said process including the step of subjecting a mixture containing the azomethine metal complex pigment (A), an uncrosslinked aromatic group-containing polymer (b) and water to dispersion treatment using a medialess disperser at an accumulated input energy of not more than 5.0 kWh/kg, [2] a pigment water dispersion liquid containing an azomethine metal complex pigment (A) and a polymer dispersant (B), in which in an optical absorption spectrum of the pigment water dispersion liquid, a ratio of a maximum absorbance ($A1_{max}$) in a wavelength range of not less than 440 nm and (Continued)

less than 465 nm to a maximum absorbance ($A2_{max}$) in a wavelength range of not less than 420 nm and less than 440 nm [($A1_{max}$)/($A2_{max}$)] is not less than 1.000, and [3] a water-based ink for ink-jet printing, containing the aforementioned pigment water dispersion liquid.

14 Claims, 1 Drawing Sheet

(51) Int. Cl.
  *C09B 55/00*     (2006.01)
  *C09D 11/033*    (2014.01)
  *C09D 11/037*    (2014.01)
  *C09D 11/322*    (2014.01)

(52) U.S. Cl.
  CPC .......... *C09D 11/033* (2013.01); *C09D 11/037* (2013.01); *C09D 11/322* (2013.01); *C09D 17/001* (2013.01)

(58) Field of Classification Search
  CPC .. C09D 11/037; C09D 17/003; C09D 17/001; C09B 55/001; B41M 5/0023
  See application file for complete search history.

(56) References Cited

U.S. PATENT DOCUMENTS

| | | |
|---|---|---|
| 2007/0227401 A1 | 10/2007 | Ganschow et al. |
| 2009/0202930 A1* | 8/2009 | Furukawa ............ G03G 9/0924 430/105 |
| 2011/0257309 A1 | 10/2011 | Yoshida et al. |
| 2012/0219715 A1 | 8/2012 | Yoshida et al. |
| 2015/0030825 A1 | 1/2015 | Ishima et al. |
| 2016/0257831 A1 | 9/2016 | Hirade et al. |
| 2016/0264799 A1 | 9/2016 | Uemura et al. |
| 2017/0009089 A1 | 1/2017 | Ishima et al. |
| 2020/0248013 A1 | 8/2020 | Egawa et al. |

FOREIGN PATENT DOCUMENTS

| | | |
|---|---|---|
| CN | 102597135 A | 7/2012 |
| CN | 104093795 A | 10/2014 |
| CN | 105612226 A | 5/2016 |
| CN | 111194336 A | 5/2020 |
| JP | 2003-55590 A | 2/2003 |
| JP | 2005-202385 A | 7/2005 |
| JP | 2007-187890 A | 7/2007 |
| JP | 2012-201710 A | 10/2012 |
| JP | 2014-56079 A | 3/2014 |
| JP | 2016-121237 A | 7/2016 |
| JP | 2016-124969 A | 7/2016 |
| JP | 2016-166326 A | 9/2016 |
| JP | 2017-119797 A | 7/2017 |
| WO | WO 03/081298 A1 | 10/2003 |
| WO | WO 2005/105931 A1 | 11/2005 |

OTHER PUBLICATIONS

Extended European Search Report for European Application No. 18894113.2, dated Dec. 7, 2021.
International Search Report (PCT/ISA/210) issued in PCT/JP2016/047084 dated Mar. 12, 2019.

* cited by examiner

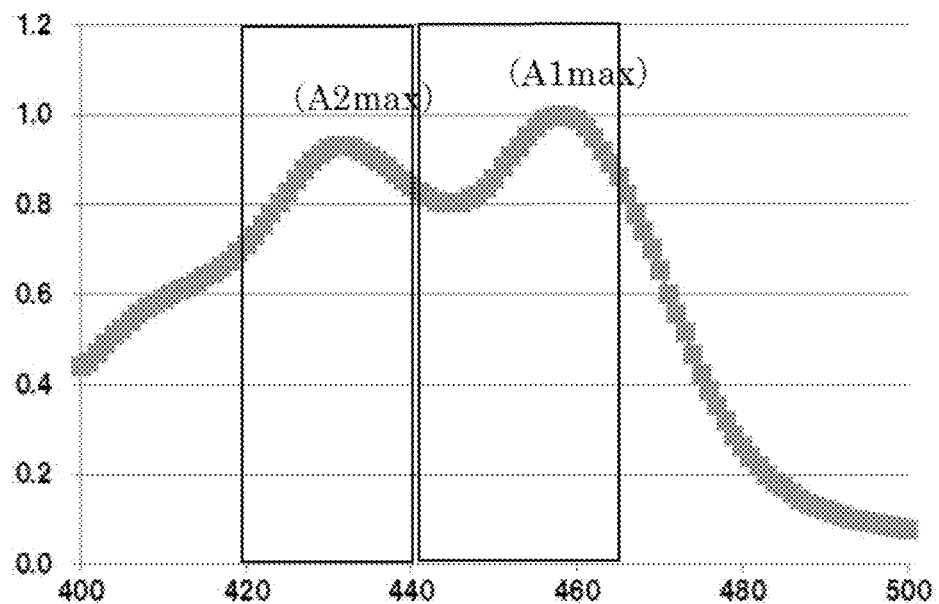

PRODUCTION METHOD FOR PIGMENT AQUEOUS DISPERSION

FIELD OF THE INVENTION

The present invention relates to a process for producing a pigment water dispersion liquid, a pigment water dispersion liquid, and a water-based ink for ink-jet printing which contains the pigment water dispersion liquid.

BACKGROUND OF THE INVENTION

As a water-based ink for ink-jet printing, there are known inks using a pigment. Although it is expected that the inks using a pigment exhibit excellent water resistance and light fastness, there tends to occur such a problem that the inks cause clogging of ejection nozzles owing to flocculation and precipitation of the pigment.

Also, the pigment tends to suffer from poor color development owing to interference between lights being different in wavelength and phase from each other, which are generated by multiple reflection of light inside of the pigment, etc. Therefore, the pigment tends to be generally deteriorated in color developability as compared to a dye. In particular, it has been highly required that a water-based ink using a yellow pigment as a colorant thereof exhibits improved optical density from the viewpoint of achieving a wide range of colors of images upon full color printing or attaining good hue of the images, etc., upon mixing the yellow color ink with other color inks.

In addition, as the method of improving ejection stability of the inks using the pigment from ink-jet nozzles, there has been proposed the method of dispersing pigment particles in the inks using a dispersant such as a polymer, etc.

The inks using an inorganic yellow pigment have however failed to well meet these requirements. Therefore, it has been expected to develop a water-based ink for ink-jet printing as a water-based ink using an organic yellow pigment which is capable of satisfying high printing quality. Several proposals have been conventionally made to provide such a water-based ink.

For example, JP 2003-55590A (Patent Literature 1) discloses an aqueous ink for ink-jet printing which is capable of forming characters or images having good color reproducibility and high transparency and exhibiting excellent ejection stability, and contains a colorant, a dispersant, a wetting agent, etc., in which a surface tension of the ink falls within a specific range, the colorant is a condensed azo pigment, a nickel complex-type azo pigment, a condensed polycyclic pigment or a phthalocyanine pigment, and the dispersant is an anionic surfactant and/or a nonionic surfactant containing an ethyleneoxide group. In Examples of the Patent Literature 1, there is described an example of the method of producing a pigment dispersion liquid in which a mixture containing C.I. Pigment Yellow 138, C.I. Pigment Yellow 150 or the like and a surfactant is coarsely dispersed using a homogenizer, and then further dispersed using a nanomizer.

JP 2012-201710A (Patent Literature 2) discloses a pigment yellow ink for ink-jet printing as an ink that is excellent in printability on a substrate having high hydrophobicity, ejection stability, storage stability, etc., which contains C.I. Pigment Yellow 150, a water-soluble solvent such as diols, etc., water and a pigment-dispersing polymer, in which the pigment-dispersing polymer is a copolymer whose composition contains a (meth)acrylate ester containing an alkyl group having 18 to 24 carbon atoms, a styrene-based monomer and (meth)acrylic acid. In Examples of the Patent Literature 2, there is described an example of the method of producing a pigment dispersion which includes the steps of subjecting C.I. Pigment Yellow 150, the dispersing polymer and water to preliminary dispersion treatment using a disper, and then subjecting the resulting dispersion to substantial dispersion treatment using DYNO-MILL packed with zirconia beads for 2 hours. In addition, in the Patent Literature 2, it is also described that C.I. Pigment Yellow 150 is, on one hand, a yellow pigment having high weathering resistance, but the other hand, exhibits poor dispersion stability that is unsuitable for use in an aqueous ink.

SUMMARY OF THE INVENTION

The present invention relates to the following aspects [1] to [3].

[1] A process for producing a pigment water dispersion liquid of polymer particles containing an azomethine metal complex pigment (A), said process including the step of subjecting a mixture containing the azomethine metal complex pigment (A), an uncrosslinked aromatic group-containing polymer (b) and water to dispersion treatment using a medialess disperser at an accumulated input energy of not more than 5.0 kWh/kg.

[2] A pigment water dispersion liquid containing an azomethine metal complex pigment (A) and a polymer dispersant (B), in which in an optical absorption spectrum of the pigment water dispersion liquid, a ratio of a maximum absorbance ($A1_{max}$) in a wavelength range of not less than 440 nm and less than 465 nm to a maximum absorbance ($A2_{max}$) in a wavelength range of not less than 420 nm and less than 440 nm [($A1_{max}$)/($A2_{max}$)] is not less than 1.000.

[3] A water-based ink for ink-jet printing, containing the pigment water dispersion liquid described in the above aspect [2].

DETAILED DESCRIPTION OF THE INVENTION

It has been conventionally required that water-based inks using a yellow pigment as a colorant are further improved in optical density thereof. However, the water-based inks using C.I. Pigment Yellow 150 as described in the Patent Literatures 1 and 2 tend to be unsatisfactory in optical density in some cases.

For example, yellow-based water-based inks using C.I. Pigment Yellow 74 as a monoazo pigment which is dispersed in the inks with a polymer are free of problems concerning ejection stability or optical density thereof. However, if C.I. Pigment Yellow 150 as an azomethine metal complex pigment is used instead in the yellow-based water-based inks for the purpose of improving color expression or heat resistance of the obtained printed materials, etc., even though the pigment is dispersed with the same polymer, there tends to sometimes occur such a problem that the water-based inks are deteriorated in ejection stability and optical density.

The present invention relates to a process for producing a pigment water dispersion liquid containing an azomethine metal complex pigment from which a water-based ink having excellent ejection stability and optical density can be obtained, a pigment water dispersion liquid, and a water-based ink for ink-jet printing containing the pigment water dispersion liquid.

The present inventors have found that the aforementioned conventional problems can be solved by subjecting a mixture containing an azomethine metal complex pigment (A) and an aromatic group-containing polymer (b) to dispersion treatment using a medialess disperser under specific conditions, or by further using a pigment water dispersion liquid containing the azomethine metal complex pigment in which a ratio of a maximum absorbance ($A1_{max}$) in a wavelength range of not less than 440 nm and less than 465 nm to a maximum absorbance ($A2_{max}$) in a wavelength range of not less than 420 nm and less than 440 nm [($A1_{max}$)/($A2_{max}$)] is controlled to a specific range.

That is, the present invention relates to the following aspects [1] to [3].

[1] A process for producing a pigment water dispersion liquid of polymer particles containing an azomethine metal complex pigment (A), said process including the step of subjecting a mixture containing the azomethine metal complex pigment (A), an uncrosslinked aromatic group-containing polymer (b) and water to dispersion treatment using a medialess disperser at an accumulated input energy of not more than 5.0 kWh/kg.

[2] A pigment water dispersion liquid containing an azomethine metal complex pigment (A) and a polymer dispersant (B), in which in an optical absorption spectrum of the pigment water dispersion liquid, a ratio of a maximum absorbance ($A1_{max}$) in a wavelength range of not less than 440 nm and less than 465 nm to a maximum absorbance ($A2_{max}$) in a wavelength range of not less than 420 nm and less than 440 nm [($A1_{max}$)/($A2_{max}$)] is not less than 1.000.

[3] A water-based ink for ink-jet printing, containing the pigment water dispersion liquid described in the above aspect [2].

In accordance with the present invention, it is possible to provide a process for producing a pigment water dispersion liquid containing an azomethine metal complex pigment from which a water-based ink having excellent ejection stability and optical density can be obtained, a pigment water dispersion liquid, and a water-based ink for ink-jet printing which contains the pigment water dispersion liquid.

BRIEF DESCRIPTION OF THE DRAWING

FIG. 1 is a schematic view showing the relationship between a maximum absorbance ($A1_{max}$) and a maximum absorbance ($A2_{max}$) in an optical absorption spectrum of the pigment water dispersion liquid of the present invention.

PIGMENT WATER DISPERSION LIQUID

The pigment water dispersion liquid of the present invention contains an azomethine metal complex pigment (A) and a polymer dispersant (B), in which in an optical absorption spectrum of the pigment water dispersion liquid, a ratio of a maximum absorbance ($A1_{max}$) in a wavelength range of not less than 440 nm and less than 465 nm to a maximum absorbance ($A2_{max}$) in a wavelength range of not less than 420 nm and less than 440 nm [($A1_{max}$)/($A2_{max}$)] is not less than 1.000.

Incidentally, the term "water dispersion liquid" as used in the present specification means a dispersion liquid in which water has a largest content among components of a medium for dispersing the pigment.

The pigment water dispersion liquid of the present invention is capable of providing a water-based ink that is excellent in ejection stability and optical density, notwithstanding that the azomethine metal complex pigment is used therein. The reason why the aforementioned advantageous effect can be attained by the present invention is considered as follows though it is not clearly determined yet.

That is, since the azomethine metal complex pigment (A) has a larger electrostatic interaction between particles thereof than that of C.I. Pigment Yellow 74 as a monoazo pigment, it is considered that the azomethine metal complex pigment (A) exhibits higher flocculability or aggregability in the water-based ink than that of the C.I. Pigment Yellow 74 that has been generally used for the water-based ink. For this reason, it is considered that if the concentration of the azomethine metal complex pigment in the water-based ink is increased and the pigment is atomized from the standpoint of improving optical density of the water-based ink, etc., the water-based ink tends to suffer from increased viscosity or formation of flocculated foreign matters in association with increase in specific surface area of the pigment. To solve these problems, it is considered that an amount of a polymer dispersant used in the water-based ink is increased in association with the increase in specific surface area of the pigment. However, if the amount of the polymer dispersant used in the water-based ink is increased, the water-based ink tends to suffer from increase in viscosity thereof. Therefore, it is not possible to simply increase the amount of the polymer dispersant contained in the water-based ink to solve the aforementioned problems.

Although the azomethine metal complex pigment (A) has a maximum absorbance ($A1_{max}$) and a maximum absorbance ($A2_{max}$) in a wavelength range of not less than 440 nm and less than 465 nm and in a wavelength range of not less than 420 nm and less than 440 nm, respectively, it has been found that in the course of subjecting the pigment (A) to dispersion treatment with the polymer dispersant (B), there occurs variation in the respective heights of the maximum absorbance ($A1_{max}$) and the maximum absorbance ($A2_{max}$). This phenomenon is attributed to change in structure of the pigment (A) owing to energy applied when dispersing the pigment (A). Therefore, it has been estimated that the maximum absorbance ($A1_{max}$) of the pigment is effective to improve optical density of the resulting ink in view of color developability thereof.

Under this circumstance, it is considered that in the process for producing a pigment water dispersion liquid of polymer particles containing the azomethine metal complex pigment (A) according to the present invention, by subjecting a mixture containing the azomethine metal complex pigment (A), an uncrosslinked aromatic group-containing polymer (b) and water to dispersion treatment using a medialess disperser at an accumulated input energy of not more than 5.0 kWh/kg, the pigment can be dispersed in such a state that the resulting ink exhibits excellent ejection stability while suppressing the change in structure of the pigment.

In addition, it is considered that when conducting the dispersion treatment using the uncrosslinked aromatic group-containing polymer (b), the polymer can be uniformly adhered to a surface of the azomethine metal complex pigment (A) owing to the interaction between the surface of the azomethine metal complex pigment (A) and the aromatic group of the polymer, so that the resulting ink can be improved in ejection stability.

Furthermore, it is considered that when the pigment (A) is dispersed in water, by controlling the dispersing conditions, etc., to adjust the ratio of the maximum absorbance ($A1_{max}$) to the maximum absorbance ($A2_{max}$) [($A1_{max}$/ ($A2max$)] to not less than 1.000, the degree of contribution of the pigment (A) itself to optical density of the resulting ink is increased, and occurrence of irregular reflection of light owing to flocculation of the pigment (A) on a paper surface upon dispersing the pigment (A) can be prevented, so that the resulting water-based ink is improved in optical density.

<Azomethine Metal Complex Pigment (A)>

The azomethine metal complex pigment (A) used in the present invention (hereinafter also referred to as a "pigment (A)" or merely as a "pigment") is in the form of a yellow-based metal complex pigment having an azomethine structure in a molecule thereof. The pigment water dispersion liquid containing the pigment (A) is also preferably used from the viewpoint of improving heat resistance of the resulting printed material.

Examples of the pigment (A) include metal complex pigments containing an azomethine compound as a ligand and a divalent or trivalent ion of a metal selected from the group consisting of Fe, Co, Ni and Zn, such as C.I. Pigment Yellow 117, C.I. Pigment Yellow 129, C.I. Pigment Yellow 150, C.I. Pigment Yellow 153, etc. Specific examples of the aforementioned metal ion include $Fe^{2+}$, $Fe^{3+}$, $Co^{2+}$, $Co^{3+}$, $Ni^{2+}$ and $Zn^{2+}$.

Among these pigments, the pigment (A) is preferably a metal complex pigment containing a cyclic azomethine compound represented by the following general formula (1) or a tautomer thereof as a ligand of the metal complex.

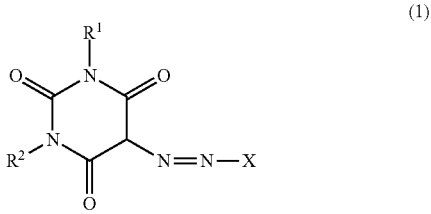

(1)

In the general formula (1), X is a monovalent aromatic hydrocarbon group having 1 to 20 carbon atoms or a group containing a 5- or 6-membered nitrogen-containing heterocyclic ring: and $R^1$ and $R^2$ are each independently a hydrogen atom, a monovalent hydrocarbon group having 1 to 5 carbon atoms, or a —$SO_3H$ group.

The pigment (A) is preferably a nickel complex pigment having a structure represented by the following general formula (2) or a pigment of a tautomer thereof.

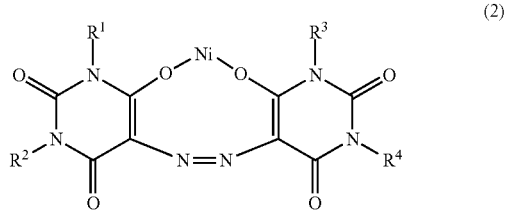

(2)

In the general formula (2), $R^1$ to $R^4$ are each independently a hydrogen atom, a monovalent hydrocarbon group having 1 to 5 carbon atoms, or a —$SO_3H$ group.

Among the aforementioned pigments (A), from the viewpoint of improving ejection stability and optical density of the resulting ink, more preferred is an azobarbituric acid nickel complex pigment represented by the following formula (3), i.e., C.I. Pigment Yellow 150.

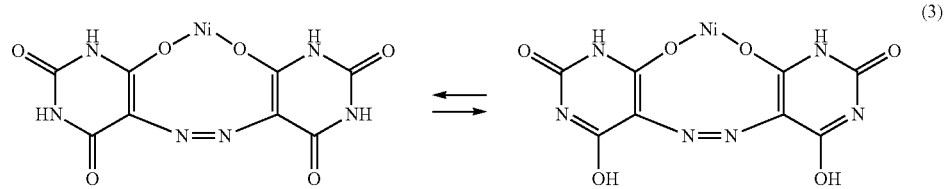

(3)

The aforementioned pigments (A) may be used alone or in the form of a mixture or a solid solution of any two or more kinds thereof. The configuration of the pigment may be either a dry pigment having a powder shape, a granular shape or a bulky shape, or a wet cake or a slurry.

In addition, the pigment (A) may also be used in combination with the other known or ordinary yellow pigment(s) which is usually used in the ink-jet printing applications, if required, unless the objects and advantageous effects of the present invention are adversely affected by inclusion thereof.

<Polymer Dispersant (B)>

In the pigment water dispersion liquid of the present invention, there is used the polymer dispersant (B) from the viewpoint of improving ejection stability and optical density of the resulting water-based ink. The polymer of the polymer dispersant (B) is preferably an uncrosslinked aromatic group-containing polymer (b) or a crosslinked aromatic group-containing polymer (B) (both hereinafter also collectively referred to merely as an "aromatic group-containing polymer (B)").

That is, in the present invention, the pigment (A) and the polymer dispersant (B) are preferably contained in the pigment water dispersion liquid in the form of the pigment that is dispersed with the polymer or in the form of a pigment-containing polymer, i.e., polymer particles formed by allowing the polymer to adhere onto a surface of the pigment (A), and more preferably contained in the form of polymer particles containing the pigment (A), in particular, in the form of aromatic group-containing polymer (B) particles containing the pigment (A) (hereinafter also referred to merely as "pigment-containing polymer particles"), from the viewpoint of improving storage stability of the pigment water dispersion liquid while maintaining good water resistance thereof.

<Aromatic Group-Containing Polymer (B)>

The aromatic group-containing polymer (B) is preferably in the form of a carboxy group-containing polymer, and may be either a water-soluble polymer or a water-insoluble polymer. However, the aromatic group-containing polymer (B) is preferably a water-insoluble polymer.

The aromatic group-containing polymer (B) may be in the from of a crosslinked aromatic group-containing polymer (B) which is produced by crosslinking the aromatic group-containing polymer (b) with a crosslinking agent (c). In this case, even if the polymer is a water-soluble polymer, the water-soluble polymer is converted into a water-insoluble polymer via the crosslinking treatment.

Meanwhile, the "water-insoluble polymer" as used herein means such a polymer that when the polymer is dried to a constant weight at 105° C. for 2 hours and then dissolved in 100 g of ion-exchanged water at 25° C. until reaching a saturated concentration thereof, the solubility in water of the polymer is less than 10 g, preferably not more than 5 g and more preferably not more than 1 g.

The aromatic group-containing polymer (B) used in the present invention is more preferably formed in an aqueous medium by dispersing the azomethine metal complex pigment (A) in the aqueous medium under such a condition that carboxy groups of the carboxy group-containing aromatic group-containing polymer (b) are at least partially neutralized, and then subjecting the thus neutralized aromatic group-containing polymer (b) to crosslinking treatment with the crosslinking agent (c).

In the preferred embodiment, the pigment water dispersion liquid contains at least the pigment-containing polymer particles prepared by enclosing (encapsulating) the pigment (A) with the polymer, and water, and may further contain an organic solvent, if required.

As the aromatic group-containing polymer (B) used in the present invention, the carboxy group-containing aromatic group-containing polymer (b) may be directly used as such if no crosslinking treatment is conducted.

The amount of the carboxy groups contained in the aromatic group-containing polymer (B) may be expressed by an acid value of the aromatic group-containing polymer (B). The acid value of the aromatic group-containing polymer (B) is preferably not less than 80 mgKOH/g and more preferably not less than 90 mgKOH/g, and is also preferably not more than 350 mgKOH/g and more preferably not more than 300 mgKOH/g, from the viewpoint of improving dispersion stability of the pigment (A).

The acid value of the aromatic group-containing polymer (B) may be calculated from mass ratios of the respective constituting monomers and the crosslinking agent. In addition, the acid value of the aromatic group-containing polymer (B) may also be determined by the method in which the polymer is dissolved in or swelled with an adequate organic solvent (e.g., MEK), if required followed by subjecting the polymer to hydrolysis, etc., to break its crosslinked bond, and then the resulting solution or swelled product is subjected to titration.

(Aromatic Group-Containing Polymer (b))

The aromatic group-containing polymer (b) has not only a function as a pigment dispersant that is capable of exhibiting the effect of dispersing the azomethine metal complex pigment (A), but also a function as a fixing agent for fixing the pigment onto a printing medium. The aromatic group-containing polymer (b) is in the form of an uncrosslinked polymer.

The amount of the carboxy groups contained in the aromatic group-containing polymer (b) may be expressed by an acid value of the aromatic group-containing polymer (b). The acid value of the aromatic group-containing polymer (b) is preferably not less than 80 mgKOH/g and more preferably not less than 90 mgKOH/g, and is also preferably not more than 400 mgKOH/g and more preferably not more than 350 mgKOH/g. When the acid value of the aromatic group-containing polymer (b) lies within the aforementioned range, it is possible to ensure good dispersion stability of the pigment (A), and it is also preferable from the viewpoint of attaining well-balanced interaction of the aromatic group-containing polymer (B) with the pigment (A).

The acid value of the aromatic group-containing polymer (b) may be calculated from mass ratios of the respective constituting monomers. In addition, the acid value of the aromatic group-containing polymer (b) may also be determined by the method in which the polymer is dissolved in or swelled with an adequate organic solvent (e.g., MEK) and then the resulting solution or swelled product is subjected to titration.

The aromatic group-containing polymer (b) is preferably in the form of a polymer that is produced by copolymerizing an aromatic group-containing monomer mixture containing (i) an aromatic group-containing monomer (hereinafter also referred to merely as a "component (i)") and (ii) a carboxy group-containing vinyl monomer (hereinafter also referred to merely as a "component (ii)") (such a mixture is hereinafter also referred to merely as a "monomer mixture"). The polymer contains a constitutional unit derived from the component (i) and a constitutional unit derived from the component (ii).

In the aromatic group-containing polymer (b), in addition to the aforementioned components (i) and (ii), (iii) a non-ionic monomer (hereinafter also referred to merely as a "component (iii)"), etc., may also used as a monomer component thereof, if required.

[(i) Aromatic Group-Containing Monomer]

The aromatic group-containing monomer (i) is used as a monomer component of the aromatic group-containing polymer (b) from the viewpoint of improving dispersion stability of the pigment water dispersion liquid.

The aromatic group-containing monomer is preferably a vinyl monomer containing an aromatic group having 6 to 22 carbon atoms which may also contain a substituent group containing a hetero atom, and more preferably a styrene-based monomer, an aromatic group-containing (meth)acrylate or a styrene-based macromonomer.

Specific examples of the styrene-based monomer include styrene, alkyl styrenes such as α-methyl styrene, β-methyl styrene, 2,4-dimethyl styrene, α-ethyl styrene, α-butyl styrene, α-hexyl styrene, etc., halogenated styrenes such as 4-fluorostyrene, 3-chlorostyrene, 3-bromostyrene, etc., 3-nitrostyrene, 4-methoxystyrene, vinyl toluene, divinyl benzene, and the like. Among these styrene-based monomers, preferred are styrene and α-methyl styrene.

Specific examples of the preferred aromatic group-containing (meth)acrylate include phenyl (meth)acrylate, benzyl (meth)acrylate, phenoxyethyl (meth)acrylate and the like. Among these aromatic group-containing (meth)acrylates, more preferred is benzyl (meth)acrylate.

The styrene-based macromonomer is in the form of a compound containing a polymerizable functional group at one terminal end thereof and having a number-average molecular weight of not less than 500 and not more than 100,000. The polymerizable functional group bonded to one terminal end of the styrene-based macromonomer is preferably an acryloyloxy group or a methacryloyloxy group.

The number-average molecular weight of the styrene-based macromonomer is preferably not less than 1,000, more preferably not less than 2,000 and even more preferably not less than 3,000, and is also preferably not more than 10,000, more preferably not more than 9,000 and even more preferably not more than 8,000. Meanwhile, the number-average molecular weight may be the value measured by gel permeation chromatography using chloroform containing 1 mmol/L of dodecyl dimethylamine as a solvent and using polystyrenes as a reference standard substance.

Specific examples of commercially available products of the styrene-based macromonomer include "AS-6(S)", "AN-6(S)" and "HS-6(S)" (tradenames) all available from Toagosei Co., Ltd., etc.

The aforementioned aromatic group-containing monomers (i) may be used alone or in combination of any two or more thereof, and a combination of the styrene-based monomer and the styrene-based macromonomer is more preferably used.

[(ii) Carboxy Group-Containing Vinyl Monomer]

The carboxy group-containing vinyl monomer (ii) is used as a monomer component of the aromatic group-containing polymer (b) from the viewpoint of improving dispersion stability of the pigment water dispersion liquid.

As the carboxy group-containing vinyl monomer, there may be used carboxylic acid monomers. Examples of the carboxylic acid monomers include acrylic acid, methacrylic acid, α-ethyl acrylic acid, crotonic acid, α-methyl crotonic acid, α-ethyl crotonic acid, isocrotonic acid, itaconic acid, maleic acid, fumaric acid, citraconic acid, mesaconic acid, glutaconic acid, 2-methacryloyloxymethylsuccinic acid and the like. Among these carboxylic acid monomers, preferred is at least one monomer selected from the group consisting of acrylic acid and methacrylic acid.

[(iii) Nonionic Monomer]

From the viewpoint of improving dispersion stability of the pigment water dispersion liquid, the nonionic monomer (iii) may also be used as a monomer component of the aromatic group-containing polymer (b), if required.

Examples of the nonionic monomer include 2-hydroxyethyl (meth)acrylate, 3-hydroxypropyl (meth)acrylate, polyalkylene glycol (meth)acrylates such as polypropylene glycol (n=2 to 30 wherein n represents an average molar number of addition of oxyalkylene groups: hereinafter defined in the same way) (meth)acrylate, polyethylene glycol (n=2 to 30) (meth) acrylate, etc., alkoxy polyalkylene glycol (meth)acrylates such as methoxy polyethylene glycol (n=1 to 30) (meth)acrylate, etc., phenoxy (ethylene glycol/propylene glycol copolymer) (n=1 to 30 in which n for ethylene glycol is 1 to 29) (meth)acrylate, and the like. Among these nonionic monomers, preferred are polypropylene glycol (n=2 to 30) (meth)acrylate and phenoxy (ethylene glycol/propylene glycol copolymer) (meth)acrylate, and more preferred is polypropylene glycol (n=2 to 30) (meth) acrylate.

Meanwhile, the term "(meth)acrylate" as used herein means at least one compound selected from the group consisting of an acrylate and a methacrylate, and the term "(meth)" is hereinafter also defined in the same way.

Specific examples of commercially available products of the nonionic monomer include "NK ESTER M-20G", "NK ESTER M-40G", "NK ESTER M-90G", "NK ESTER M-230G" and the like all available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like all available from NOF Corporation, etc.

The aromatic group-containing polymer (b) used in the present invention may also contain a constitutional unit(s) derived from the other monomer(s) than the aforementioned monomers unless the objects and advantageous effects of the present invention are adversely affected by inclusion thereof.

Examples of the other monomer(s) include alkyl (meth) acrylates having 1 to 22 carbon atoms and preferably 6 to 18 carbon atoms, such as methyl (meth)acrylate, 2-ethylhexyl (meth)acrylate, etc., hydroxyalkyl (meth)acrylates such as 2-hydroxyethyl (meth)acrylate, 3-hydroxypropyl (meth) acrylate, etc., and silicone-based macromonomers such as organopolysiloxanes containing a polymerizable functional group at one terminal end thereof, etc.

The aforementioned monomer components may be respectively used alone or in the form of a mixture of any two or more thereof.

(Contents of Respective Components in Monomer Mixture or Contents of Respective Constitutional Units in Polymer)

The contents of the aromatic group-containing monomer (i), the carboxy group-containing vinyl monomer (ii), and the nonionic monomer (iii) which may be contained as an optional component, if required, in the monomer mixture (contents of non-neutralized components; hereinafter defined in the same way) upon production of the aromatic group-containing polymer (b), i.e., the contents of the constitutional units derived from the respective components (i), (ii) and (iii) in the aromatic group-containing polymer (b) are as follows, from the viewpoint of improving affinity of the aromatic group-containing polymer (b) to the azomethine metal complex pigment (A) as well as from the viewpoint of improving storage stability of the pigment water dispersion liquid.

The content of the aromatic group-containing monomer (i) is preferably not less than 30% by mass, more preferably not less than 40% by mass and even more preferably not less than 50% by mass, and is also preferably not more than 80% by mass, more preferably not more than 70% by mass and even more preferably not more than 65% by mass.

In addition, in the case where the styrene-based macromonomer is included as the component (i), the styrene-based macromonomer is preferably used in combination with the other monomer(s) such as the styrene-based monomer and/or the aromatic group-containing (meth)acrylate, etc. The content of the styrene-based macromonomer is preferably not less than 5% by mass, more preferably not less than 10% by mass and even more preferably not less than 12% by mass, and is also preferably not more than 40% by mass, more preferably not more than 30% by mass and even more preferably not more than 20% by mass.

The content of the carboxy group-containing vinyl monomer (ii) is preferably not less than 5% by mass, more preferably not less than 8% by mass and even more preferably not less than 10% by mass, and is also preferably not more than 60% by mass, more preferably not more than 50% by mass and even more preferably not more than 45% by mass.

The mass ratio of the component (ii) to the component (i) [component (ii)/component (i)] is preferably not less than 0.1, more preferably not less than 0.15 and even more preferably not less than 0.20, and is also preferably not more than 1.0, more preferably not more than 0.9 and even more preferably not more than 0.8.

In the case where the nonionic monomer (iii) is included, the content of the nonionic monomer (iii) is preferably not less than 10% by mass, more preferably not less than 15% by mass and even more preferably not less than 20% by mass, and is also preferably not more than 45% by mass, more preferably not more than 40% by mass and even more preferably not more than 30% by mass.

In addition, in the case where the components (i), (ii) and (iii) are included, the mass ratio of the component (ii) to a sum of the component (i) and the component (iii) [component (ii)/[component (i)+component (iii)]] is preferably not less than 0.03, more preferably not less than 0.05 and even more preferably not less than 0.10, and is also preferably not more than 0.5, more preferably not more than 0.4 and even more preferably not more than 0.3.

(Production of Aromatic Group-Containing Polymer (b))

The aromatic group-containing polymer (b) may be produced by copolymerizing the aforementioned monomer mixture by known polymerization methods such as a bulk polymerization method, a solution polymerization method, a suspension polymerization method and an emulsion polymerization method, etc. Among these polymerization methods, preferred is the solution polymerization method.

The solvent used in the solution polymerization method is not particularly limited, and is preferably an organic polar solvent. If the organic polar solvent is miscible with water, the organic polar solvent may be used in the form of a mixture with water. Examples of the organic polar solvents include aliphatic alcohols having 1 to 3 carbon atoms; ketones having 3 to 5 carbon atoms; ethers; and esters such as ethyl acetate, etc. Among these organic polar solvents, preferred is methanol, ethanol, acetone, methyl ethyl ketone or a mixed solvent of at least one of these compounds with water, and more preferred is methyl ethyl ketone or a mixed solvent of methyl ethyl ketone and water.

The polymerization may be carried out in the presence of a polymerization initiator or a polymerization chain transfer agent.

Examples of the polymerization initiator include conventionally known radical polymerization initiators, e.g., azo compounds such as 2,2'-azobisisobutyronitrile, 2,2'-azobis (2,4-dimethylvaleronitrile), etc., and organic peroxides such as tert-butyl peroxyoctoate, benzoyl peroxide, etc. The amount of the radical polymerization initiator used in the polymerization reaction is preferably from 0.001 to 5 mol and more preferably from 0.01 to 2 mol per 1 mol of the monomer mixture.

Examples of the polymerization chain transfer agent include conventionally known chain transfer agents, e.g., mercaptans such as octyl mercaptan, 2-mercaptoethanol, etc., thiuram disulfides, and the like.

In addition, the type of a polymerization chain of the monomers polymerized is not particularly limited, and may be any polymerization type selected from a random type, a block type, a graft type, etc. Among these polymerization types, preferred is a random type or a graft type, and more preferred is a random type.

The preferred polymerization conditions may vary depending upon the kinds of polymerization initiators, monomers and solvents used, etc. In general, the polymerization temperature is preferably not lower than 30° C. and more preferably not lower than 50° C., and is also preferably not higher than 95° C. and more preferably not higher than 80° C. The polymerization time is preferably not less than 1 hour and more preferably not less than 2 hours, and is also preferably not more than 20 hours and more preferably not more than 10 hours. Furthermore, the polymerization is preferably conducted in a nitrogen gas atmosphere or in an atmosphere of an inert gas such as argon, etc.

After completion of the polymerization reaction, the polymer produced may be isolated from the obtained reaction solution by known methods such as reprecipitation and removal of the solvent by distillation, etc. In addition, the resulting polymer may be purified by removing the unreacted monomers, etc., from the reaction solution by reprecipitation, membrane separation, chromatography, extraction, etc.

In the present invention, as the method of dispersing the pigment (A) with the aromatic group-containing polymer (b), there may be used optional conventionally known dispersing methods. However, it is preferred that the below-mentioned water dispersion liquid of the pigment-containing polymer particles is obtained by the dispersing method. From the viewpoint of enhancing productivity of the water dispersion liquid of the pigment-containing polymer particles, the aromatic group-containing polymer (b) is preferably used in the form of an aromatic group-containing polymer (b) solution without removing the organic solvent used in the polymerization reaction therefrom in order to use the organic solvent contained therein as an organic solvent to be used in the below-mentioned step 1.

The solid content of the aromatic group-containing polymer (b) solution is preferably not less than 30% by mass and more preferably not less than 40% by mass, and is also preferably not more than 80% by mass and more preferably not more than 75% by mass, from the viewpoint of enhancing productivity of the water dispersion liquid of the pigment-containing polymer particles.

The weight-average molecular weight of the aromatic group-containing polymer (b) used in the present invention is preferably not less than 5,000, more preferably not less than 7,000 and even more preferably not less than 9,000, and is also preferably not more than 80,000, more preferably not more than 70,000 and even more preferably not more than 60,000. When the weight-average molecular weight of the aromatic group-containing polymer (b) lies within the aforementioned range, the polymer has a sufficient adsorption force to the pigment and therefore allows the resulting water-based ink to exhibit good storage stability.

Meanwhile, the weight-average molecular weight of the polymer may be measured by the method described in Examples below.

[Process for Producing Pigment Water Dispersion Liquid of Pigment-Containing Polymer Particles]

The process for producing the pigment water dispersion liquid of polymer particles containing the azomethine metal complex pigment (A) according to the present invention includes the step of subjecting a mixture containing the azomethine metal complex pigment (A), the uncrosslinked aromatic group-containing polymer (b) and water to dispersion treatment using a medialess disperser at an accumulated input energy of not more than 5.0 kWh/kg.

The polymer particles containing the azomethine metal complex pigment (A) which are obtained in the step of conducting the dispersion treatment are preferably further subjected to the step of conducting crosslinking treatment of the aromatic group-containing polymer (b) after the step of conducting the dispersion treatment from the viewpoint of improving dispersibility of the pigment. The step of conducting the crosslinking treatment is preferably the below-mentioned step 3. The polymer constituting the polymer particles containing the azomethine metal complex pigment (A) is preferably either the uncrosslinked aromatic group-containing polymer (b) or the crosslinked aromatic group-containing polymer (B).

That is, the pigment water dispersion liquid of the pigment-containing polymer particles containing the azomethine metal complex pigment (A) according to the present invention can be efficiently produced by the process including the following steps 1 and 2, which may further includes the following step 3, if required.

Step 1: subjecting a mixture containing the azomethine metal complex pigment (A), the aromatic group-containing polymer (b), an organic solvent and water (hereinafter also referred to merely as a "pigment mixture") to dispersion treatment using a medialess disperser at an accumulated input energy of not more than 5.0 kWh/kg to obtain a pigment dispersion liquid;

Step 2: removing the organic solvent from the pigment dispersion liquid obtained in the step 1 to obtain a pigment water dispersion liquid A; and Step 3: subjecting the pigment water dispersion liquid A obtained in the step 2 to crosslinking treatment with the crosslinking agent (c) to obtain a pigment water dispersion liquid B in which the azomethine metal complex pigment (A) is incorporated in the crosslinked aromatic group-containing polymer (B).

(Step 1)

In the step 1, it is preferred that the aromatic group-containing polymer (b) is first dissolved in the organic solvent and then neutralized with a neutralizing agent, followed by adding the azomethine metal complex pigment (A) to the thus neutralized solution, and the resulting mixture is subjected to dispersion treatment.

The method for producing the aromatic group-containing polymer (b) is the same as described hereinbefore. When using no organic solvent in the step 1, the below-mentioned step 2 may be omitted.

The organic solvent used for dissolving the aromatic group-containing polymer (b) is not particularly limited, and is preferably a volatile organic solvent having a boiling point of not higher than 150° C. under atmospheric pressure. Examples of the organic solvent include aliphatic alcohols having 1 to 3 carbon atoms, ketones such as acetone, methyl ethyl ketone, diethyl ketone, methyl isobutyl ketone, etc., ethers such as ethyl ether, isopropyl ether, tetrahydrofuran, etc., esters, and the like. Of these organic solvents, from the viewpoints of improving wettability to the pigment, solubility of the aromatic group-containing polymer (b) therein and adsorption of the polymer onto the pigment, more preferred are ketones having not less than 4 and not more than 8 carbon atoms, even more preferred are methyl ethyl ketone and methyl isobutyl ketone, and further even more preferred is methyl ethyl ketone.

When the aromatic group-containing polymer (b) is produced by a solution polymerization method, the solvent used in the solution polymerization method may be directly used as such in the step 1.

(Neutralizing Agent)

It is preferred that the carboxyl groups contained in the aromatic group-containing polymer (b) are at least partially neutralized with a neutralizing agent to control a pH value of the pigment water dispersion liquid to the range of not less than 7 and not more than 11, from the viewpoint of improving water resistance, storage stability, etc., of the resulting pigment water dispersion.

The neutralizing agent is preferably an alkali metal hydroxide. Examples of the alkali metal hydroxide include lithium hydroxide, sodium hydroxide, potassium hydroxide and cesium hydroxide. Of these alkali metal hydroxides, preferred are sodium hydroxide and potassium hydroxide. Also, the aromatic group-containing polymer may be previously neutralized.

The neutralizing agent is preferably used in the form of an aqueous solution thereof, and the concentration of the aqueous neutralizing agent solution is preferably not less than 5% by mass and more preferably not less than 10% by mass, and is also preferably not more than 50% by mass and more preferably not more than 30% by mass.

The amount of the neutralizing agent added preferably corresponds to from 0.2 to 1.0 time of such an amount of the neutralizing agent as is required to neutralize whole carboxy groups contained in the aromatic group-containing polymer (b).

The neutralization degree of the carboxy groups of the aromatic group-containing polymer (b) is preferably not less than 20 mol %, more preferably not less than 25 mol % and even more preferably not less than 30 mol %, and is also preferably not more than 80 mol %, more preferably not more than 70 mol % and even more preferably not more than 66 mol %, from the viewpoint of improving water resistance and storage stability of the resulting pigment water dispersion liquid.

The neutralization degree as used herein means the value calculated by dividing a mole equivalent number of the neutralizing agent by a mole equivalent number of the carboxy groups of the polymer dispersant. The neutralizing degree does not basically exceed 100%. However, in the present invention, since the neutralization degree is calculated from the amount of the neutralizing agent used, the neutralization degree will exceed 100 mol % if the neutralization agent is used in an excessively large amount.

In the step 1, as the neutralizing agent, a volatile basic compound such as ammonia, trimethylamine, triethylamine and the like may also be used in addition to the alkali metal hydroxide.

Upon calculation of the neutralization degree in the present invention, the amount of the alkali metal hydroxide used is included in the calculation of the neutralization degree, whereas the amount of the volatile basic compound used is excluded from the calculation thereof.

(Contents of Respective Components in Pigment Mixture)

The contents of the respective components in the pigment mixture in the step 1 are as follows from the viewpoint of improving water resistance, storage stability and productivity of the resulting aqueous pigment dispersion liquid.

The content of the pigment (A) in the pigment mixture is preferably not less than 2% by mass, more preferably not less than 3% by mass and even more preferably not less than 5% by mass, and is also preferably not more than 35% by mass, more preferably not more than 30% by mass and even more preferably not more than 20% by mass.

The content of the aromatic group-containing polymer (b) in the pigment mixture is preferably not less than 1% by mass, more preferably not less than 2% by mass and even more preferably not less than 3% by mass, and is also preferably not more than 8% by mass, more preferably not more than 7% by mass and even more preferably not more than 6% by mass.

The content of the organic solvent in the pigment mixture is preferably not less than 5% by mass, more preferably not less than 7% by mass and even more preferably not less than 10% by mass, and is also preferably not more than 35% by mass, more preferably not more than 30% by mass and even more preferably not more than 25% by mass.

The content of water in the pigment mixture is preferably not less than 40% by mass, more preferably not less than 45% by mass and even more preferably not less than 50% by mass, and is also preferably not more than 85% by mass, more preferably not more than 80% by mass and even more preferably not more than 75% by mass.

The mass ratio of the pigment (A) to the aromatic group-containing polymer (b) [pigment (A)/aromatic group-containing polymer (b)] in the pigment mixture is preferably not less than 1.5, more preferably not less than 2 and even more preferably not less than 2.2, and is also preferably not more than 4, more preferably not more than 3.8 and even more preferably not more than 3.5.

(Dispersion Treatment of Pigment Mixture)

In the step 1, the pigment mixture is subjected to dispersion treatment using a medialess disperser at an accumulated input energy of not more than 5.0 kWh/kg. The pigment particles may be atomized into fine particles having a desired average particle size only by substantial dispersion treatment. However, it is preferred that the pigment mixture is first subjected to preliminary dispersion treatment, and then further subjected to the substantial dispersion treatment by applying a shear stress thereto so as to control the average particle size of the obtained pigment particles to a desired value.

When subjecting the pigment mixture to the preliminary dispersion treatment, there may be employed ordinary mixing and stirring devices such as anchor blades, disper blades, etc. Of these devices, preferred are high-speed stirring mixers.

As a means for applying a shear stress to the pigment mixture in the substantial dispersion treatment, from the viewpoint of adequately reducing a particle size of the pigment as well as from the viewpoint of improving ejection stability and optical density of the resulting water-based ink, medialess dispersers using none of dispersing media such as balls, beads, etc., are preferably employed. The medialess dispersers are capable of dispersing the pigment particles not by directly applying a physical force to the pigment particles, but by using an effect or action of tearing off the pigment particles from surrounding environments, such as shear stress, cavitation, etc., which are generated in the dispersion liquid, and therefore has such a feature that they hardly cause damage to a surface of the respective pigment particles or crystallizability thereof.

Examples of the medialess dispersers include kneading machines such as roll mills, kneaders, etc., high-pressure homogenizers such as "MICROFLUIDIZER" available from Microfluidics Corporation, and the like. Among these devices, the high-pressure homogenizers are preferably used.

In the case where the substantial dispersion treatment is conducted using the high-pressure homogenizer, the particle size of the pigment can be adjusted to a desired value by controlling the treating pressure and the number of passes through the high-pressure homogenizer. The treating pressure is preferably not less than 60 MPa, more preferably not less than 100 MPa and even more preferably not less than 130 MPa, and is also preferably not more than 200 MPa and more preferably not more than 180 MPa, from the viewpoint of enhancing productivity and cost efficiency. Also, the number of passes through the high-pressure homogenizer is preferably not less than 3 and more preferably not less than 10, and is also preferably not more than 30 and more preferably not more than 25.

The temperature used upon the dispersion treatment is not particularly limited, and is preferably not lower than 5° C. and not higher than 60° C.

The accumulated input energy used upon the dispersion treatment is preferably not less than 0.1 kWh/kg, more preferably not less than 0.2 kWh/kg, even more preferably not less than 0.25 kWh/kg and further even more preferably not less than 0.3 kWh/kg, and is also preferably not more than 4.5 kWh/kg, more preferably not more than 4.0 kWh/kg, even more preferably not more than 3.8 kWh/kg, further even more preferably not more than 3.5 kWh/kg and still further even more preferably not more than 2.5 kWh/kg, from the viewpoint of adequately reducing a particle size of the pigment as well as from the viewpoint of improving ejection stability and optical density of the resulting water-based ink.

The "accumulated input energy" as used herein means a power obtained by subtracting an idle running power from an actual loading power applied to the medialess disperser, in which the "idle running power" means a power of the disperser when operated under the condition that no dispersing media are used therein.

In addition, when applying the dispersing energy to the pigment dispersion liquid, from the viewpoint of controlling a flow rate of the pigment dispersion liquid treated by the disperser to an adequate range as well as from the viewpoint of preventing the change in particle size or viscosity of the pigment dispersion liquid owing to heat generation, the average retention time of the pigment dispersion liquid in a dispersing chamber of the disperser per one pass through the disperser is preferably from 30 seconds to 10 minutes. In addition, the total average retention time obtained by multiplying the average retention time by the number of passes through the disperser may vary depending upon a capacity and a size of the disperser used, and is preferably in the range of from 5 to 100 minutes. The average retention time as used herein means the value calculated by dividing a space volume [L] of the dispersing chamber by the flow rate [L/h] of the pigment dispersion liquid treated by the disperser.

(Step 2)

The step 2 is the step of removing the organic solvent from the pigment dispersion liquid obtained in the step 1 to obtain a pigment water dispersion liquid A. In the case where no organic solvent is used in the step 1, it is not necessary to conduct the step 2.

The removal of the organic solvent may be conducted by conventionally known methods. The organic solvent is preferably substantially completely removed from the thus obtained pigment water dispersion liquid A. However, the residual organic solvent may be present in the pigment water dispersion liquid A unless the objects and advantageous effects of the present invention are adversely affected by the residual organic solvent. In addition, if required, the pigment dispersion liquid may be subjected to heating and stirring treatments before removing the organic solvent therefrom by distillation.

In the thus-obtained pigment water dispersion liquid A, the pigment-containing polymer particles are dispersed in a dispersing medium containing water as a main medium. The configuration of the pigment-containing polymer particles in the pigment water dispersion liquid A is not particularly limited, and the pigment-containing polymer particles may have any configuration as long as the particles are formed of at least the pigment (A) and the aromatic group-containing polymer (b). As described above, the particle configuration in which the pigment (A) is enclosed or encapsulated in the aromatic group-containing polymer (b) is preferred.

The concentration of non-volatile components in the resulting pigment water dispersion liquid A (solid content of the pigment water dispersion liquid A) is preferably not less than 10% by mass, more preferably not less than 15% by mass and even more preferably not less than 20% by mass, and is also preferably not more than 40% by mass, more preferably not more than 35% by mass and even more preferably not more than 30% by mass, from the viewpoint of improving dispersion stability of the pigment water dispersion liquid.

Meanwhile, the solid content of the pigment water dispersion liquid A may be measured by the method described in Examples below.

The average particle size of the pigment-containing polymer particles in the pigment water dispersion liquid A is preferably not less than 50 nm, more preferably not less than 60 nm and even more preferably not less than 70 nm, and is also preferably not more than 180 nm, more preferably not more than 160 nm and even more preferably not more than 140 nm, from the viewpoints of suppressing formation of coarse particles and improving ejection stability of the resulting ink.

Meanwhile, the average particle size of the pigment-containing polymer particles may be measured by the method described in Examples below.

(Step 3)

The step 3 is the step of subjecting the pigment water dispersion liquid A obtained in the step 2 to crosslinking treatment with the crosslinking gent (c) to obtain a pigment water dispersion liquid B in which the pigment (A) is incorporated into the crosslinked aromatic group-containing polymer (B). In this step, the carboxy groups contained in the aromatic group-containing polymer (b) constituting the pigment-containing polymer particles are partially crosslinked to form a crosslinked structure in a surface layer portion of the respective pigment-containing polymer particles.

Thus, the crosslinked aromatic group-containing polymer (B) is produced by the reaction between the aromatic group-containing polymer (b) and the crosslinking gent (c) on the surface of the pigment.

<Crosslinking Agent (c)>

The crosslinking gent (c) used in the present invention is preferably an epoxy compound, and more preferably a water-insoluble polyfunctional epoxy compound.

The solubility in water of the water-insoluble polyfunctional epoxy compound as measured by dissolving the epoxy compound in 100 g of water at 20° C. is preferably not more than 50 g, more preferably not more than 40 g and even more preferably not more than 35 g from the viewpoint of efficiently reacting the water-insoluble polyfunctional epoxy compound with the carboxy groups of the aromatic group-containing polymer (b) in the dispersing medium containing water as a main component.

In addition, from the viewpoint of improving ejection stability and optical density of the resulting water-based ink, the water solubility rate of the water-insoluble polyfunctional epoxy compound is preferably not more than 50% by mass, more preferably not more than 40% by mass and even more preferably not more than 35% by mass. The "water solubility rate" as used herein means a rate (% by mass) of dissolution of the water-insoluble polyfunctional epoxy compound as measured by dissolving 10 parts by mass of the epoxy compound in 90 parts by mass of water at room temperature (25° C.). More specifically, the water solubility rate may be measured by the method described in Examples below.

The polyfunctional epoxy compound is preferably a compound containing two or more epoxy groups and preferably two or more glycidyl ether groups in a molecule thereof, and more preferably a glycidyl ether compound of a polyhydric alcohol containing a hydrocarbon group having not less than 3 and not more than 8 carbon atoms.

The molecular weight of the polyfunctional epoxy compound is preferably not less than 120, more preferably not less than 150 and even more preferably not less than 200, and is also preferably not more than 1500, more preferably not more than 1000 and even more preferably not more than 800, from the viewpoint of facilitating the crosslinking reaction and improving storage stability of the resulting crosslinked polymer.

The number of epoxy groups contained in the polyfunctional epoxy compound is preferably from 2 to 6 per a molecule of the epoxy compound, and more preferably from 3 to 6 per a molecule of the epoxy compound, from the viewpoint of efficiently reacting the epoxy compound with the carboxy groups of the polymer to thereby enhance storage stability of the resulting pigment-containing polymer particles, etc. Since the polyfunctional epoxy compounds containing not less than 5 epoxy groups in a molecule thereof are less available in the market, the use of those polyfunctional epoxy compounds containing 3 or 4 epoxy groups in a molecule thereof is more preferable from the viewpoint of meeting both requirements of high reactivity and good cost efficiency.

From the same viewpoint as described above, the epoxy equivalent of the polyfunctional epoxy compound is preferably not less than 100, more preferably not less than 110 and even more preferably not less than 120, and is also preferably not more than 300, more preferably not more than 270 and even more preferably not more than 250.

Specific examples of the polyfunctional epoxy compound include polyglycidyl ethers such as polypropylene glycol diglycidyl ether, glycerin polyglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether and hydrogenated bisphenol A-type diglycidyl ethers, and the like. Of these polyfunctional epoxy compounds, preferred are trimethylolpropane polyglycidyl ether (water solubility rate: 27% by mass) and pentaerythritol polyglycidyl ether (water-insoluble).

(Crosslinking Reaction)

In the present invention, a part of the carboxy groups contained in the aromatic group-containing polymer (b) is neutralized with the neutralizing agent for dispersing the pigment (A) to obtain the pigment water dispersion liquid A. Then, a part of the carboxy groups contained in the aromatic group-containing polymer (b) is further reacted with the crosslinking agent (c) to form a crosslinked structure therein, thereby obtaining an aqueous pigment dispersion liquid B in which the pigment (A) is dispersed in an aqueous medium using the aromatic group-containing polymer (B) produced in the reaction system.

The crosslinking reaction between the carboxy groups contained in the aromatic group-containing polymer (b) and the crosslinking agent (c) is preferably conducted after dispersing the pigment (A) with the aromatic group-containing polymer (b).

From the same viewpoint as described above, the temperature used in the crosslinking reaction is preferably not lower than 40° C., more preferably not lower than 50° C. and even more preferably not lower than 60° C., and is also preferably not higher than 95° C. and more preferably not higher than 90° C. The time of the crosslinking reaction is preferably not less than 0.5 hour and more preferably not less than 1 hour, and is also preferably not more than 12 hours and more preferably not more than 10 hours.

The crosslinking degree of the crosslinked aromatic group-containing polymer (B) is preferably not less than 5 mol %, more preferably not less than 10 mol % and even more preferably not less than 15 mol %, and is also preferably not more than 80 mol %, more preferably not more than 70 mol % and even more preferably not more than 60 mol %. The crosslinking degree of the crosslinked aromatic group-containing polymer (B) is an apparent crosslinking degree calculated by a percent ratio (mol %) of a mole equivalent number of the epoxy groups of the crosslinking agent (c) to a mole equivalent number of the carboxy groups of the aromatic group-containing polymer (b) [(mole equivalent number of epoxy groups of crosslinking agent (c))/(mole equivalent number of carboxy groups of aromatic group-containing polymer (b))].

The average particle size of the pigment-containing polymer particles in the pigment water dispersion liquid B is preferably not less than 50 nm, more preferably not less than 60 nm and even more preferably not less than 70 nm, and is also preferably not more than 180 nm, more preferably not more than 160 nm and even more preferably not more than 140 nm, from the viewpoints of suppressing formation of coarse particles and improving ejection stability of the resulting water-based ink.

Meanwhile, the average particle size of the pigment-containing polymer particles may be measured by the method described in Examples below.

In addition, the average particle size of the pigment-containing polymer particles in the water-based ink according to the present invention is substantially the same as the average particle size of the pigment-containing polymer particles in the pigment water dispersion liquid B.

The pH value of the pigment water dispersion liquid B is preferably not less than 8.0 and more preferably not less than 8.5. When the pH value of the pigment water dispersion liquid B is not less than 8.0, dissociation of the anionic groups from the polymer is promoted, and the amount of electric charges present in the pigment dispersion liquid is sufficient, so that the resulting pigment dispersion liquid can be enhanced in storage stability. The upper limit of the pH value of the pigment water dispersion liquid B is not particularly limited. However, the pH value of the pigment water dispersion liquid B is preferably not more than 11 and more preferably not more than 10.5 in order to prevent members of a printer or a printing apparatus from being adversely influenced thereby.

The method of measuring the pH value is not particularly limited, and the pH measuring method using a glass electrode as prescribed in JIS Z 8802 is preferably used from the viewpoint of good convenience and high accuracy.

(Maximum Absorbance Ratio [$(A1_{max})/(A2_{max})$])

In the optical absorption spectrum of the pigment water dispersion liquid according to the present invention, the ratio of a maximum absorbance ($A1_{max}$) in a wavelength range of not less than 440 nm and less than 465 nm to a maximum absorbance ($A2_{max}$) in a wavelength range of not less than 420 nm and less than 440 nm [$(A1_{max})/(A2_{max})$] is not less than 1.000 from the viewpoint of improving ejection stability and optical density of the resulting water-based ink.

FIG. 1 is a schematic view showing the relationship between the maximum absorbance ($A1_{max}$) and the maximum absorbance ($A2_{max}$) in the optical absorption spectrum of the pigment water dispersion liquid of the present invention. The maximum absorbance ($A1_{max}$) in a wavelength range of not less than 440 nm and less than 465 nm and the maximum absorbance ($A2_{max}$) in a wavelength range of not less than 420 nm and less than 440 nm may be measured using a spectrophotometer. Therefore, the maximum absorbance ratio [$(A1_{max})/(A2_{max})$] can be calculated from these measured values.

The respective maximum absorbance values are measured using pigment-containing precipitated components obtained by subjecting the pigment water dispersion liquid to centrifugal separation treatment in order to avoid adverse influence of additives, etc., contained in the pigment water dispersion liquid. More specifically, the maximum absorbance values may be measured by the method described in Examples below.

The maximum absorbance ratio [$(A1_{max})/(A2_{max})$] is preferably not less than 1.01, more preferably not less than 1.02, even more preferably not less than 1.04 and further even more preferably not less than 1.05, and is also preferably not more than 1.18, more preferably not more than 1.16, even more preferably not more than 1.14 and further even more preferably not more than 1.12.

[Water-Based Ink for Ink-Jet Printing]

The water-based ink for ink-jet printing according to the present invention contains the pigment water dispersion liquid of the present invention.

The water-based ink may be efficiently produced by mixing the pigment water dispersion liquid with an organic solvent (D), a surfactant (E) and various additives such as a wetting agent, a penetrant, a humectant, a dispersant, a viscosity modifier, a pH controller, a defoaming agent, an antiseptic agent, a mildew-proof agent, a rust preventive, an antioxidant, etc., which may be optionally added according to requirements. The method of mixing these components is not particularly limited.

<Organic Solvent (D)>

The organic solvent (D) is used from the viewpoint of further improving storage stability of the resulting water-based ink, etc. The organic solvent used herein preferably contains one or more organic solvents having a boiling point of not lower than 90° C., and the boiling point of the organic solvent (in terms of a weighted mean value of boiling points of the respective organic solvents contained therein) is preferably not higher than 250° C. The weighted mean value of boiling points of the respective organic solvents contained in the organic solvent is preferably not lower than 150° C. and more preferably not lower than 180° C. from the viewpoint of suppressing adhesion or fixing of the ink, and is also preferably not higher than 245° C., more preferably not higher than 220° C. and even more preferably not higher than 200° C. from the viewpoint of improving an image quality of the resulting printed material.

Examples of the aforementioned organic solvent include a polyhydric alcohol, a polyhydric alcohol alkyl ether, a nitrogen-containing heterocyclic compound, an amide, an amine and the like. Of these organic solvents, preferred is at least one compound selected from the group consisting of a polyhydric alcohol and a polyhydric alcohol alkyl ether, and more preferred is a polyhydric alcohol.

Specific examples of the polyhydric alcohol include ethylene glycol, diethylene glycol, polyethylene glycol, propylene glycol, dipropylene glycol, polypropylene glycol, 1,3-propanediol, 1,3-butanediol, 1,4-butanediol, 3-methyl-1,3-butanediol, 1,5-pentanediol, 1,6-hexanediol, 2-methyl-2,4-pentanediol, 1,2,6-hexanetriol, 1,2,4-butanetriol, 1,2,3-butanetriol, petriol, etc. Among these polyhydric alcohols, preferred are ethylene glycol (b.p. 197° C.), propylene glycol (b.p. 188° C.) and diethylene glycol (b.p. 244° C.), and more preferred are propylene glycol and diethylene glycol.

Specific examples of the polyhydric alcohol alkyl ether include diethylene glycol monoisopropyl ether, dipropylene glycol monomethyl ether, and the like.

The water-based ink of the present invention may contain a plurality of organic solvents. The content of the organic solvents having a boiling point of higher than 250° C. in the water-soluble organic solvent is preferably less than 10% by mass, more preferably not more than 5% by mass, even more preferably not more than 3% by mass, further even more preferably not more than 1% by mass and still further even more preferably 0% by mass.

(Surfactant (D))

The surfactant may be added to the water-based ink in order to control properties of the ink such as a surface tension, etc. Examples of the surfactant include an anionic surfactant, a nonionic surfactant and an amphoteric surfactant. Of these surfactants, preferred are an anionic surfactant and a nonionic surfactant, and more preferred is a nonionic surfactant.

Examples of the anionic surfactant include alkylbenzenesulfonic acid salts, alkylphenylsulfonic acid salts, alkylnaphthalenesulfonic acid salts, higher fatty acid salts, sulfuric acid ester salts of higher fatty acid esters, sulfonic acid salts of higher fatty acid esters, sulfuric acid ester salts and sulfonic acid salts of higher alcohol ethers, higher alkyl sulfosuccinic acid salts, polyoxyethylene alkylethercarboxylic acid salts, polyoxyethylene alkylethersulfuric acid salts, alkyl phosphoric acid salts, polyoxyethylene alkyletherphosphoric acid salts, etc.

Examples of the nonionic surfactant include polyoxyethylene alkyl ethers, polyoxyethylene alkyl phenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglycerin fatty acid esters, sucrose fatty acid esters, polyoxyethylene alkyl amines, polyoxyethylene fatty acid amides, fatty acid alkylol amides, alkyl alkanol amides, acetylene glycol, oxyethylene adducts of acetylene glycol, polysiloxane oxyethylene adducts, etc. Of these nonionic surfactants, preferred are acetylene glycol-based surfactants.

As the acetylene glycol-based surfactants, preferred are acetylene glycols having not less than 8 and not more than 22 carbon atoms and ethylene adducts of the acetylene glycols, and more preferred are acetylene glycols having not less than 8 and not more than 22 carbon atoms.

Specific examples of commercially available products of the acetylene glycol-based surfactants include "SURFYNOL 104", "SURFYNOL 104PG-50", "SURFYNOL 420" and "SURFYNOL 465" all available from Air Products & Chemicals, Inc., and the like.

These surfactants may be used alone or in the form of a mixture of any two or more thereof.

The content of the surfactant in the water-based ink is not particularly limited, and is from 0.001 to 3% by mass, preferably from 0.01 to 2% by mass and more preferably from 0.1 to 1.0% by mass.

The contents of the respective components in the water-based ink of the present invention as well as properties of the ink are as follows.

(Content of Azomethine Metal Complex Pigment (A))

The content of the pigment (A) in the water-based ink is preferably not less than 2% by mass, more preferably not less than 2.5% by mass and even more preferably not less than 3% by mass from the viewpoint of enhancing optical density of the water-based ink upon printing, and is also preferably not more than 12% by mass, more preferably not more than 10% by mass, even more preferably not more than 8% by mass and further even more preferably not more than 6% by mass from the viewpoint of reducing viscosity of the water-based ink upon volatilizing the solvent therefrom and improving storage stability of the water-based ink under high-temperature conditions.

(Total Content of Azomethine Metal Complex Pigment (A) and Aromatic Group-Containing Polymer (B))

The total content of the pigment (A) and the aromatic group-containing polymer (B) in the water-based ink is preferably not less than 1.5% by mass, more preferably not less than 1.8% by mass, even more preferably not less than 2.0% by mass and further even more preferably not less than 2.2% by mass, and is also preferably not more than 15% by mass, more preferably not more than 12% by mass, even more preferably not more than 10% by mass and further even more preferably not more than 9% by mass.

The mass ratio of the azomethine metal complex pigment (A) to the aromatic group-containing polymer (B) [(A)/(B)] is not less than 1.4, preferably not less than 1.6, more preferably not less than 1.8, even more preferably not less than 2.0 and further even more preferably not less than 2.2, and is also not more than 4, preferably not more than 3.8, more preferably not more than 3.6, even more preferably not more than 3.4 and further even more preferably not more than 3.2, from the viewpoint of improving ejection stability and optical density of the resulting water-based ink.

(Content of Organic Solvent (D))

The content of the organic solvent (D) in the water-based ink is preferably not less than 15% by mass, more preferably not less than 20% by mass and even more preferably not less than 30% by mass, and is also preferably not more than 70% by mass, more preferably not more than 60% by mass and even more preferably not more than 50% by mass, from the viewpoint of improving storage stability and maintenanceability of the water-based ink.

(Content of Water)

The content of water in the water-based ink is preferably not less than 20% by mass, more preferably not less than 30% by mass and even more preferably not less than 40% by mass, and is also preferably not more than 80% by mass, more preferably not more than 70% by mass and even more preferably not more than 60% by mass, from the viewpoint of improving storage stability and maintenanceability of the water-based ink.

(Properties of Water-Based Ink)

The viscosity of the water-based ink as measured at 32° C. is preferably not less than 2.0 mPa·s, more preferably not less than 3.0 mPa·s and even more preferably not less than 5.0 mPa·s, and is also preferably not more than 12 mPa·s, more preferably not more than 9.0 mPa·s and even more preferably not more than 7.0 mPa·s, form the viewpoint of improving storage stability of the resulting water-based ink.

The pH value of the water-based ink is preferably not less than 7.0, more preferably not less than 7.2 and even more preferably not less than 7.5 form the viewpoint of further improving storage stability of the resulting water-based ink, and is also preferably not more than 11.0, more preferably not more than 10.0 and even more preferably not more than 9.5 from the viewpoint of improving the resistance of members to the water-based ink and suppressing skin irritation.

The water-based ink of the present invention is excellent in storage stability and capable of providing a good printed material, and therefore can be suitably used as an ink for flexo printing, gravure printing or ink-jet printing. In particular, the water-based ink of the present invention is preferably used as a water-based ink for ink-jet printing.

The water-based ink of the present invention may be loaded to a conventionally known ink-jet printing apparatus from which droplets of the ink are ejected onto a printing medium to print characters or images, etc., on the printing medium.

The ink-jet printing apparatus may be any of a continuous injection type (a charge-controlling type, a spray type, etc.), an on-demand type (a piezoelectric type, a thermal type, an electrostatic attraction type, etc.) and the like. It is more preferred that the water-based ink of the present invention is used as a water-based ink for ink-jet printing which is used in an ink-jet printing apparatus of a piezoelectric type.

Examples of the printing medium usable in the present invention include a high-water absorbing plain paper, and a low-water absorbing coated paper and a low-water absorbing film. Specific examples of the coated paper include a versatile glossy coated paper, a multi-color foam glossy coated paper, etc. Specific examples of the film include a polyester film, a polyvinyl chloride film, a polypropylene film, a polyethylene film, etc.

EXAMPLES

In the following Production Examples, Examples, Comparative Examples, Preparation Examples and Comparative Preparation Examples, the "part(s)" and "%" indicate "part(s) by mass" and "% by mass", respectively, unless otherwise specified.

(1) Measurement of Weight-Average Molecular Weight of Polymer

The weight-average molecular weight of the polymer was measured by gel permeation chromatography [GPC apparatus: "HLC-8120GPC" available from Tosoh Corporation; columns: "TSK-GEL, α-M"×2 available from Tosoh Corporation; flow rate: 1 mL/min] using a solution prepared by dissolving phosphoric acid (guaranteed reagent) available from FUJIFILM Wako Pure Chemical Corporation and lithium bromide (reagent) available from Tokyo Chemical Industry Co., Ltd., in N,N-dimethylformamide (for high-performance liquid chromatography) available from FUJIFILM Wako Pure Chemical Corporation such that concentrations of phosphoric acid and lithium bromide in the resulting solution were 60 mmol/L and 50 mmol/L, respectively, as an eluent, and using monodisperse polystyrenes having known molecular weights as a reference standard substance.

(2) Measurement of Solid Content of Pigment Water Dispersion Liquid

Sodium sulfate dried to constant weight in a desiccator was weighed and charged in an amount of 10.0 g into a 30 mL polypropylene container ($: 40 mm; height: 30 mm), and about 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

(3) Measurement of Water Solubility Rate of Polyfunctional Epoxy Compound

A glass tube (25 mmφ in diameter×250 mm in height) was charged with 90 parts by mass of ion-exchanged water and 10 parts by mass of a crosslinking agent at room temperature (25° C.). The glass tube thus charged was allowed to stand for 1 hour in a thermostatic bath controlled to a water temperature of 25° C. Next, the contents of the glass tube were vigorously shaken for 1 minute, and then the glass tube was placed again in the thermostatic bath, followed by allowing the glass tube to stand in the bath for 10 minutes. Then, the mass of undissolved components in the glass tube was measured to calculate a water solubility rate (% by mass) of the crosslinking agent.

(4) Measurement of Average Particle Size of Pigment-Containing Polymer Particles The particles were subjected to cumulant analysis using a laser particle analyzing system "ELSZ-1000" available from Otsuka Electrics Co., Ltd., to measure an average particle size thereof. The measurement was conducted using a dispersion liquid prepared by diluting the dispersion to be measured with water so as to adjust a concentration of the particles in the dispersion to $5\times10^{-3}$% by mass (in terms of a solid content thereof). Also, the measurement was conducted under the conditions including a temperature of 25° C., an angle between incident light and detector of 165° and a cumulative number of 100 times, and a refractive index of water (1.333) was input to the analyzing system as a refractive index of the dispersing medium. The thus measured cumulant average particle size of the particles was defined as an average particle size of the pigment-containing polymer particles.

(5) Measurement of Absorbance Ratio

The pigment water dispersion liquid was accurately weighed in an amount of 0.9 g, and then mixed with ion-exchanged water to dilute the dispersion liquid times therewith, and the resulting dilute dispersion was stirred until becoming uniform. The resulting dispersion was placed in a tube and subjected to centrifugal separation using a centrifugal separator "himac CR22G" (high-speed cooling centrifuge) available from Hitachi Koki Co., Ltd., equipped with a rotor "RPR18-3" available from Hitachi Koki Co., Ltd., at 18000 r/m under the condition of 25° C. for 3 hours. After completion of the centrifugal separation, a supernatant liquid separated from the resulting dispersion in the tube was discarded, and then ion-exchanged water was added thereto, followed by stirring the obtained mixture using a rotary roll-type stirrer "VMR-5R" (rotary stirring agitator) available from AS ONE Corporation at 100 r/m for 1 hour, to thereby obtain a redispersion liquid.

One gram of the redispersion liquid as a sample to be measured was mixed with ion-exchanged water to dilute the liquid 10000 times therewith. Next, the optical absorption spectrum of the thus diluted sample was obtained using a spectrophotometer "Model No.: U-3010" available from Hitachi High-Tech Science Corporation to measure a maximum absorbance ($A1_{max}$) thereof in a wavelength range of not less than 440 nm and less than 465 nm and a maximum absorbance ($A2_{max}$) thereof in a wavelength range of not less than 420 nm and less than 440 nm, from which a maximum absorbance ratio [($A1_{max}$)/($A2_{max}$)] was calculated.

<Production of Water-Insoluble Polymer>

Production Example 1 (Production of Water-Insoluble Polymer B1 Solution)

The monomers, solvent (methyl ethyl ketone: MEK) and polymerization chain transfer agent (2-mercaptoethanol) shown in the column "Initially Charged Monomer Solution" in Table 1 were charged into a reaction vessel equipped with two dropping funnels 1 and 2 and mixed with each other, and an inside atmosphere of the reaction vessel was replaced with nitrogen gas, thereby obtaining an initially charged monomer solution.

On the other hand, the monomers, solvent, polymerization initiator "V-65" (tradename; 2,2'-azobis(2,4-dimethylvaleronitrile)) available from FUJIFILM Wako Pure Chemical Corporation and polymerization chain transfer agent shown in the column "Dropping Monomer Solution 1" in Table 1 were mixed with each other to obtain a dropping monomer solution 1. The thus obtained dropping monomer solution 1 was charged into the dropping funnel 1, and an inside atmosphere of the dropping funnel 1 was replaced with nitrogen gas.

In addition, the monomers, solvent, polymerization initiator and polymerization chain transfer agent shown in the column "Dropping Monomer Solution 2" in Table 1 were mixed with each other to obtain a dropping monomer solution 2. The thus obtained dropping monomer solution 2 was charged into the dropping funnel 2, and an inside atmosphere of the dropping funnel 2 was replaced with nitrogen gas.

In a nitrogen atmosphere, the initially charged monomer solution in the reaction vessel was maintained at 77° C. while stirring, and the dropping monomer solution 1 in the dropping funnel 1 was gradually added dropwise to the reaction vessel over 3 hours. Next, the dropping monomer solution 2 in the dropping funnel 2 was gradually added dropwise to the reaction vessel over 2 hours. After completion of the dropwise addition, the mixed solution in the reaction vessel was stirred at 77° C. for 0.5 hour.

Then, a polymerization initiator solution prepared by dissolving 0.6 part of the aforementioned polymerization initiator "V-65" in 27.0 parts of methyl ethyl ketone was added to the mixed solution in the reaction vessel, and the resulting reaction solution was aged at 77° C. for 1 hour while stirring. The aforementioned procedure including the preparation and addition of the polymerization initiator solution and the aging of the reaction solution was repeated five more times. Then, while maintaining the reaction solution in the reaction vessel at 80° C. for 1 hour, methyl ethyl ketone was added thereto, thereby obtaining a solution of a water-insoluble polymer B1 (solid content: 40.8%).

The weight-average molecular weight and the acid value of the thus obtained water-insoluble polymer B1 were 52,700 and 104 mgKOH/g, respectively. In addition, the resulting water-insoluble polymer B1 was dried to constant weight at 105° C. for 2 hours, and the thus dried polymer was then dissolved in water to prepare a polymer solution having a concentration of $5 \times 10^{-3}$% by mass in terms of a solid content thereof. As a result, it was confirmed that the average particle size of the polymer particles in the resulting solution was 89 nm.

Meanwhile, the details of the respective monomers shown in Table 1 were as follows.

Styrene macromer: "AS-6(S)" (number-average molecular weight: 6000; 50% by mass methyl isobutyl ketone solution) available from Toagosei Co., Ltd.

M-40G: Methoxy polyethylene glycol monomethacrylate "NK ESTER M-40G" (average molar number of addition of ethyleneoxide: 4; end group: methoxy group) available from Shin-Nakamura Chemical Co., Ltd.

TABLE 1

| | | Initially charged monomer solution (part(s)) | Dropping monomer solution 1 (part(s)) | Dropping monomer solution 2 (part(s)) |
|---|---|---|---|---|
| (i) Aromatic group-containing monomer | Styrene | 17.6 | 140.8 | 17.6 |
| | Styrene macromer | 12.0 | 108.0 | — |
| (ii) Carboxy group-containing vinyl monomer | Methacrylic acid | — | 51.2 | 12.8 |
| (iii) Nonionic monomer | M-40G | 10.0 | 80.0 | 10.0 |
| Solvent | Methyl ethyl ketone | 6.0 | 66.0 | 48.0 |
| Polymerization initiator | V-65 | — | 3.2 | 0.8 |
| Polymerization chain transfer agent | 2-Mercapto-ethanol | 0.08 | 0.56 | 0.16 |

Production Example 2 (Production of Water-Insoluble Polymer B2 Solution)

Eighty four parts of acrylic acid, 108 parts of styrene and 8 parts of α-methyl styrene were mixed to prepare a monomer mixture solution. Twenty parts of MEK and 0.3 part of 2-mercaptoethanol as a polymerization chain transfer agent as well as 10% of the monomer mixture solution prepared above were charged into a reaction vessel and mixed with each other, and then an inside atmosphere of the reaction vessel was fully replaced with nitrogen gas.

On the other hand, a mixed solution prepared by mixing remaining 90% of the monomer mixture solution, 0.27 part of the aforementioned polymerization chain transfer agent, 60 parts of MEK and 2.2 parts of an azo-based radical polymerization initiator "V-65" was charged into a dropping funnel. In a nitrogen atmosphere, the monomer mixed solution in the reaction vessel was heated to 65° C. while stirring, and then the mixed solution in the dropping funnel was added dropwise thereinto over 3 hours. After the elapse of 2 hours from completion of the dropwise addition while maintaining the resulting mixed solution at 65° C., a solution prepared by dissolving 0.3 part of the aforementioned polymerization initiator in 5 parts of MEK was added to the mixed solution, and the resulting reaction solution was further aged at 65° C. for 2 hours and then at 70° C. for 2 hours to thereby obtain a carboxy group-containing polymer solution (B2) (solid content: 71.0%; weight-average molecular weight of the polymer: 16500; acid value of the polymer: 327 mgKOH/g).

<Preparation of Pigment Water Dispersion Liquid>

Example 1 (Preparation of Water Dispersion Liquid 1 of Pigment-Containing Polymer Particles)

(1) The water-insoluble polymer B1 solution (solid content: 40.8%) obtained in Production Example 1 and MEK were mixed with each other in amounts of 147.1 g and 119.1 g, respectively, thereby obtaining an MEK solution of the water-insoluble polymer B1. The resulting MEK solution of the water-insoluble polymer B1 was charged into a 2 L-capacity disper, and while stirring the solution at 1400 rpm, 591.8 g of ion-exchanged water, 16.0 g of a 5N sodium hydroxide aqueous solution and 1.9 g of a 25% ammonia aqueous solution were added thereto such that the degree of neutralization of the water-insoluble polymer B1 by sodium hydroxide was adjusted to 60 mol % and the degree of neutralization of the water-insoluble polymer B1 by ammonia was adjusted to 25 mol %. The resulting reaction solution was stirred at 2000 rpm for 15 minutes while cooling the solution in a water bath at 0° C.

Then, 180 g of C.I. Pigment Yellow 150 "Bayscript Yellow 4GF" available from LANXESS AG was added to the reaction solution, and the resulting mixture was stirred at 6400 rpm for 1 hour. The resulting pigment mixture was subjected to high-pressure dispersion treatment under a pressure of 150 MPa using a high-pressure disperser "Microfluidizer" available from Microfluidics Corporation by passing the mixture through the device 3 times, thereby obtaining a dispersion treatment product. It was confirmed that the solid content of the resulting dispersion treatment product was 23.0% by mass.

(2) A 2 L eggplant-shaped flask was charged with 1000 g of the dispersion treatment product obtained in the above step, and then 533.3 g of ion-exchanged water was added thereto (solid content: 15.0% by mass). The resulting mixture was maintained under a pressure of 0.09 MPa in a warm water bath adjusted to 32° C. for 3 hours using a rotary distillation apparatus "Rotary Evaporator N-1000S" available from Tokyo Rikakikai Co., Ltd., operated at a rotating speed of 50 rpm to remove the organic solvent therefrom. Furthermore, the temperature of the warm water bath was adjusted to 62° C., and the pressure in the apparatus was reduced to 0.07 MPa, and the reaction solution was concentrated under this condition until a solid content of the reaction solution reached 25.0% by mass.

(3) The thus obtained concentrated solution was charged into a 500 mL angle rotor, and subjected to centrifugal separation using a high-speed cooling centrifuge "himac CR22G" (temperature set: 20° C.) available from Hitachi Koki Co., Ltd., at 7000 rpm for 20 minutes. Thereafter, the resulting liquid layer portion was subjected to filtration treatment through a 5 μm-mesh membrane filter "Minisart" available from Sartorius Inc.

Four hundred grams of the resulting filtrate (C.I. Pigment Yellow 150: 73.5 g; water-insoluble polymer B1: 24.5 g) were mixed with 52.42 g of ion-exchanged water and then with 1.37 g of "Ploxel LVS" (mildew-proof agent; active ingredient content: 20%) available from Arch Chemicals Japan, Inc., and further mixed with 2.35 g of trimethylolpropane polyglycidyl ether "DENACOL EX-321L" (molecular weight: 302; epoxy equivalent: 140; water solubility rate: 27%) as a crosslinking agent available from Nagase ChemteX Corporation, followed by stirring the resulting mixture at 70° C. for 3 hours (crosslinking degree: 40 mol %). The obtained reaction solution was cooled to 25° C., and then subjected to filtration treatment through the aforementioned 5 μm-mesh filter. Furthermore, the obtained filtered product was mixed with ion-exchanged water so as to adjust a solid content of the resulting dispersion to 22.0% by mass, thereby obtaining a water dispersion liquid 1 of pigment-containing polymer particles formed by allowing the polymer to adhere onto the surface of the pigment. The results are shown in Table 2.

Examples 2 to 5 (Preparation of Water Dispersion Liquids 2 to 5 of Pigment-Containing Polymer Particles)

The same procedure as in Example 1 was repeated except that the number of passes through the disperser upon the high-pressure dispersion treatment in Example 1 was changed from 3 to 5, 10, 30 and 2, respectively, as shown in Table 2, thereby obtaining water dispersion liquids 2 to 5.

Example 6 (Water Dispersion Liquid 6 of Pigment-Containing Polymer Particles)

The polymer produced by drying the water-insoluble polymer B2 solution (solid content: 71.0%) obtained in Production Example 2 under reduced pressure was weighed in an amount of 58.1 parts, and mixed with 71.5 parts of MEK. Then, 23.6 parts of a 5N sodium hydroxide aqueous solution (content of sodium hydroxide as solid components: 16.9%; for volumetric titration) available from FUJIFILM Wako Pure Chemical Corporation were further added into the resulting mixed solution to neutralize the polymer such that the ratio of the number of moles of the sodium hydroxide to the number of moles of carboxy groups of the polymer was 40% (neutralization degree: 40 mol %), followed by further adding 695.1 parts of ion-exchanged water thereto. Then, 200 g of the aforementioned C.I. Pigment Yellow 150 "Bayscript Yellow 4GF" was added to the resulting mixture. The thus obtained dispersion was stirred at 20° C. for 60 minutes using a disper "ULTRA DISPER" (tradename) available from Asada Iron Works Co., Ltd., under the condition that a disper blade thereof was operated at a rotating speed of 7000 rpm.

The resulting pigment mixture was subjected to high-pressure dispersion treatment under a pressure of 150 MPa using a medialess disperser "Microfluidizer" (high-pressure disperser) available from Microfluidics Corporation by passing the mixture through the device 10 times, thereby obtaining a dispersion treatment product.

(2) A 2 L eggplant-shaped flask was charged with 1000 g of the dispersion treatment product obtained in the above step, and then 666.7 g of ion-exchanged water was added thereto (solid content: 15.0% by mass). The resulting solution was concentrated using the aforementioned rotary evaporator in the same manner as in Example 1(2) until a solid content of the solution reached 25.0% by mass.

(3) The thus obtained concentrated solution was subjected to filtration treatment in the same manner as in Example 1(3).

Four hundred grams of the resulting filtrate (C.I. Pigment Yellow 150: 76.0 g; water-insoluble polymer B2: 22.1 g) were mixed with 61.61 g of ion-exchanged water, and further mixed with 1.08 g of the aforementioned "Ploxel LVS" (mildew-proof agent) and then with 4.86 g of the aforementioned "DENACOL EX-321L" (crosslinking agent), followed by stirring the resulting mixture at 70° C. for 3 hours (crosslinking degree: 40 mol %). The obtained reaction solution was cooled to 25° C., and then subjected to filtration treatment through the aforementioned 5 μm-mesh filter. Furthermore, the obtained filtered product was mixed with ion-exchanged water so as to adjust a solid content of the resulting mixture to 22.0% by mass, thereby obtaining a water dispersion liquid 6 of pigment-containing polymer particles. The results are shown in Table 2.

Comparative Example 1 (Preparation of Pigment Water Dispersion Liquid 7 Using Low-Molecular Dispersant)

(1) A low-molecular dispersant "LATEMUL E-118B" (tradename; anionic surfactant; sodium polyoxyethylenealkylethersulfate; solid content: 26.0%) available from Kao Corporation and MEK were mixed with each other in amounts of 230.8 g and 35.4 g, respectively, thereby obtaining an MEK solution of the low-molecular dispersant. The resulting MEK solution of the low-molecular dispersant was charged into a 2 L-capacity disper, and while stirring the solution at 1400 rpm, 609.7 g of ion-exchanged water was added thereto, followed by stirring the resulting solution at 2000 rpm for 15 minutes while cooling the solution in a water bath at 0° C.

Then, 180 g of C.I. Pigment Yellow 150 "Bayscript Yellow 4GF" available from LANXESS AG was added to the obtained solution, and the resulting mixture was stirred at 6400 rpm for 1 hour. The resulting pigment mixture was subjected to high-pressure dispersion treatment under a pressure of 150 MPa using a high-pressure disperser "Microfluidizer" available from Microfluidics Corporation by passing the mixture through the device 5 times, thereby obtaining a dispersion treatment product. It was confirmed that the solid content of the resulting dispersion treatment product was 23.0% by mass.

(2) A 2 L eggplant-shaped flask was charged with 1000 g of the dispersion treatment product obtained in the above step, and then 533.3 g of ion-exchanged water was added thereto (solid content: 15.0% by mass). The resulting mixture was maintained under a pressure of 0.09 MPa in a warm water bath adjusted to 32° C. for 3 hours using a rotary distillation apparatus "Rotary Evaporator N-1000S" available from Tokyo Rikakikai Co., Ltd., operated at a rotating speed of 50 rpm to remove the organic solvent therefrom. Furthermore, the temperature of the warm water bath was adjusted to 62° C., and the pressure in the apparatus was reduced to 0.07 MPa, and the reaction solution was concentrated under this condition until a solid content of the reaction solution reached 25.0% by mass.

(3) The thus obtained concentrated solution was charged into a 500 mL angle rotor, and subjected to centrifugal separation using a high-speed cooling centrifuge "himac CR22G" (temperature set: 20° C.) available from Hitachi Koki Co., Ltd., at 7000 rpm for 20 minutes. Thereafter, the resulting liquid layer portion was subjected to filtration treatment through a 5 μm-mesh membrane filter "Minisart" available from Sartorius Inc.

Four hundred grams of the resulting filtrate (C.I. Pigment Yellow 150: 73.5 g; low-molecular dispersant: 24.5 g) were mixed with 45.0 g of ion-exchanged water and then with 1.37 g of "Ploxel LVS" (mildew-proof agent; active ingredient content: 20%) available from Arch Chemicals Japan, Inc., followed by stirring the resulting mixture at 25° C. for 3 hours. Thereafter, the obtained reaction solution was subjected to filtration treatment through the aforementioned 5 μm-mesh filter. Furthermore, the obtained filtered product was mixed with ion-exchanged water so as to adjust a solid content of the resulting dispersion to 22.0% by mass, thereby obtaining a pigment water dispersion liquid 7. The results are shown in Table 2.

Comparative Example 2 (Preparation of Water Dispersion Liquid 8 of Pigment-Containing Polymer Particles)

The same procedure as in Example 1 was repeated except that the medialess disperser "Microfluidizer" (high-pressure disperser) available from Microfluidics Corporation used in Example 1 was replaced with a media disperser "Ultra Apex Mill; Model No.: UAM-1" available from Kotobuki Industries Co., Ltd., packed with 0.05 mmϕ zirconia beads "YTZ Ball" (as dispersing media particles produced by a granulation method; beads packing rate: 80%) available from Nikkato Corporation, and the dispersion treatment was conducted by a circulation method under the conditions including an stirring blade peripheral speed of 12 m/s and a circulation flow rate of 500 mL/min for 1 hour, thereby obtaining a water dispersion liquid 8 of pigment-containing polymer particles. The results are shown in Table 2.

Comparative Example 3 (Preparation of Water Dispersion Liquid 9 of Pigment-Containing Polymer Particles)

The same procedure as in Comparative Example 2 was repeated except that the dispersing time used in Comparative Example 2 was changed from 1 hour to 2 hours, thereby obtaining a water dispersion liquid 9 of pigment-containing polymer particles. The results are shown in Table 2.

<Preparation of Water-Based Inks>

Preparation Example 1 (Preparation of Water-Based Ink 1)

The water dispersion liquid 1 of the pigment-containing polymer particles containing C.I. Pigment Yellow 150 (solid content: 22% by mass) obtained in Example 1 was weighed in an amount of 27.93 g, and mixed with 37.50 g of propylene glycol (PG) available from FUJIFILM Wako Pure Chemical Corporation, 10.00 g of diethylene glycol (DEG) available from FUJIFILM Wako Pure Chemical Corporation and 1.00 g of an acetylene glycol-based surfactant "SURFYNOL 465" (tradename; ethyleneoxide (10 mol) adduct of "SURFYNOL 104" (2,4,7,9-tetramethyl-5-decyne-4,7-diol)) available from Nissin Chemical Co., Ltd., and then 23.57 g of ion-exchanged water was added to the resulting mixture so as to adjust a total amount of the mixture to 100 g, thereby obtaining a water-based ink 1.

Preparation Examples 2 to 5 (Production of Water-Based Inks 2 to 5)

The same procedure as in Preparation Example 1 was repeated except that the water dispersion liquid 1 obtained in Example 1 was replaced with the water dispersion liquids 2 to 5 obtained in Examples 2 to 5, respectively, thereby obtaining water-based inks 2 to 5.

Preparation Example 6 (Preparation of Water-Based Ink 6)

The same procedure as in Preparation Example 1 was repeated except that the water dispersion liquid 1 (solid content: 22% by mass) obtained in Example 1 was replaced with 26.78 g of the water dispersion liquid 6 (solid content: 22% by mass) obtained in Example 6, thereby obtaining a water-based ink 6.

Comparative Preparation Example 1 (Production of Water-Based Ink 7)

The same procedure as in Preparation Example 1 was repeated except that the water dispersion liquid 1 (solid content: 22% by mass) obtained in Example 1 was replaced with 27.27 g of the pigment water dispersion liquid 7 (solid content: 22% by mass) using the low-molecular dispersant obtained in Comparative Example 1, thereby obtaining a water-based ink 7.

Comparative Preparation Example 2 (Production of Water-Based Ink 8)

The water dispersion liquid 8 of the pigment-containing polymer particles containing C.I. Pigment Yellow 150 (solid content: 22% by mass) obtained in Comparative Example 2 was weighed in an amount of 27.93 g, and mixed with 37.50 g of propylene glycol (PG) available from FUJIFILM Wako Pure Chemical Corporation, 10.00 g of diethylene glycol (DEG) available from FUJIFILM Wako Pure Chemical Corporation and 1.00 g of "SURFYNOL 465" available from Nissin Chemical Co., Ltd., and then 23.57 g of ion-exchanged water was added to the resulting mixture so as to adjust a total amount of the mixture to 100 g, thereby obtaining a water-based ink 8.

Comparative Preparation Example 3 (Production of Water-Based Ink 9)

The water dispersion liquid 9 of the pigment-containing polymer particles containing C.I. Pigment Yellow 150 (solid content: 22% by mass) obtained in Comparative Example 3 was weighed in an amount of 27.93 g, and mixed with 37.50 g of propylene glycol (PG) available from FUJIFILM Wako Pure Chemical Corporation, 10.00 g of diethylene glycol (DEG) available from FUJIFILM Wako Pure Chemical Corporation and 1.00 g of "SURFYNOL 465" available from Nissin Chemical Co., Ltd., and then 23.57 g of ion-exchanged water was added to the resulting mixture so as to adjust a total amount of the mixture to 100 g, thereby obtaining a water-based ink 9.

Reference Example 1

The same procedure as in Example 3 was repeated except that C.I. Pigment Yellow 150 "Bayscript Yellow 4GF" available from LANXESS AG used in Example 3 was replaced with C.I. Pigment Yellow 74 "Fast Yellow 7414" available from Sanyo Color Works, Ltd., thereby obtaining a water dispersion liquid 10 (absorbance ratio of pigment-containing polymer particles 10:1.043).

Reference Example 2

The same procedure as in Comparative Example 3 was repeated except that C.I. Pigment Yellow 150 "Bayscript Yellow 4GF" available from LANXESS AG used in Comparative Example 3 was replaced with C.I. Pigment Yellow 74 "Fast Yellow 7414" available from Sanyo Color Works, Ltd., thereby obtaining a water dispersion liquid 11 (absorbance ratio of pigment-containing polymer particles 11:1.026).
<Preparation of Water-Based Inks and Evaluation Test for Water-Based Inks>
(Preparation of Water-Based Inks)
Using the respective water-based inks obtained in the aforementioned Preparation Examples, Comparative Preparation Examples and Reference Examples, the following evaluation tests were conducted. The results are shown in Table 2.
(1) Evaluation of Optical Density
Using the water-based ink, image printing was conducted on a plain paper "4200" (water absorption: 14.0 g/m$^2$) available from Fuji Xerox Co., Ltd., by the following ink-jet printing method to evaluate optical density of the water-based ink upon printing.
(Ink-Jet Printing Method)
Under the environmental conditions of a temperature of 25±1° C. and a relative humidity of 30±5%, the water-based ink was loaded into a print evaluation apparatus available from Trytech Co., Ltd., equipped with an ink-jet print head "KJ4B-HD06MHG-STDV" (piezoelectric type) available from Kyocera Corporation.

The operating conditions of the print evaluation apparatus were set to an applied head voltage of 26 V, a frequency of 20 kHz, an ejected ink droplet amount of 11 pL, a head temperature of 32° C., a resolution of 600 dpi, the number of ink shots for flushing before being ejected of 200 shots and a negative pressure of −4.0 kPa, and the printing medium was fixed on a transportation table by vacuum such that the longitudinal direction of the printing medium was aligned with a transportation direction thereof. A printing command was transmitted to the aforementioned print evaluation apparatus to print a Duty 100% image on the printing medium. The resulting printed material was allowed to stand for one day, and then subjected to measurement of optical density at optional 10 positions thereof using an optical densitometer "SpectroEye" available from Gretag-Macbeth AG to calculate an average of the measured values.
(2) Intermittent Ejection Properties
Using the same ink-jet printer as used in the above paragraph (1), printing was conducted. Thereafter, the ink-jet printer was allowed to stand for 30 minutes without protecting a nozzle face thereof. Then, a print check pattern that is capable of judging ejection or non-ejection of the ink from all of nozzles (2656 nozzles) was printed on a printing paper, and the number of missing nozzles (corresponding to the number of clogged nozzles from which no ink could not be normally ejected) was counted to evaluate intermittent ejection properties of the ink after suspending the printing operation according to the following evaluation ratings. The less the number of the clogged nozzles (missing nozzles) becomes, the more excellent the ejection properties of the ink is.
(Evaluation Ratings)
  5: No missing nozzles were present;
  4: Number of missing nozzles was from 1 to 2;
  3: Number of missing nozzles was from 3 to 5;
  2: Number of missing nozzles was from 6 to 10; and
  1: Number of missing nozzles was not less than 11.

TABLE 2

| | Water dispersion liquid prepared | Composition (% by mass) of pigment water dispersion liquid | | | | | | |
|---|---|---|---|---|---|---|---|---|
| | | Pigment (A) | | Polymer (B) | | Ratio | Neutralizing agent | Dispersion treatment |
| | | Kind | (%) | Kind | (%) | [(A)/(B)] | Kind | method |
| Example 1 | 1 | PY150 | 4.5 | B1 | 1.6 | 2.8 | NaOH NH$_3$ | High-pressure dispersion 3 passes |
| Example 2 | 2 | PY150 | 4.5 | B1 | 1.6 | 2.8 | NaOH NH$_3$ | High-pressure dispersion 5 passes |

TABLE 2-continued

| | | | | | | | | |
|---|---|---|---|---|---|---|---|---|
| Example 3 | 3 | PY150 | 4.5 | B1 | 1.6 | 2.8 | NaOH NH$_3$ | High-pressure dispersion 10 passes |
| Example 4 | 4 | PY150 | 4.5 | B1 | 1.6 | 2.8 | NaOH NH$_3$ | High-pressure dispersion 30 passes |
| Example 5 | 5 | PY150 | 4.5 | B1 | 1.6 | 2.8 | NaOH NH$_3$ | High-pressure dispersion 2 passes |
| Example 6 | 6 | PY150 | 4.5 | B2 | 1.6 | 2.8 | NaOH | High-pressure dispersion 10 passes |
| Comparative Example 1 | 7 | PY150 | 4.5 | B3 | 1.5 | 3.0 | — | High-pressure dispersion 5 passes |
| Comparative Example 2 | 8 | PY150 | 4.5 | B1 | 1.6 | 2.8 | NaOH NH$_3$ | Beads mill 1 hour |
| Comparative Example 3 | 9 | PY150 | 4.5 | B1 | 1.6 | 2.8 | NaOH NH$_3$ | Beads mill 2 hours |
| Reference Example 1 | 10 | PY74 | 4.5 | B1 | 1.6 | 2.8 | NaOH NH$_3$ | High-pressure dispersion 10 passes |
| Reference Example 2 | 11 | PY74 | 4.5 | B1 | 1.6 | 2.8 | NaOH NH$_3$ | Beads mill 2 hours |

| | Composition (% by mass) of pigment water dispersion liquid | | | Water dispersion liquid | | | Evaluation of ink | |
|---|---|---|---|---|---|---|---|---|
| | Accumulated input energy (kWh/kg) | Crosslinking agent Kind | Water (%) | Average particle size (nm) | Absorbance ratio*[1] | Kind of ink | Intermittent ejection properties (%) | Optical density |
| Example 1 | 0.33 | C1 | 45.4 | 128 | 1.101 | 1 | 5 | 1.05 |
| Example 2 | 0.55 | C1 | 45.4 | 118 | 1.099 | 2 | 5 | 1.06 |
| Example 3 | 1.10 | C1 | 45.4 | 99 | 1.093 | 3 | 5 | 1.06 |
| Example 4 | 3.30 | C1 | 45.4 | 90 | 1.080 | 4 | 4 | 1.06 |
| Example 5 | 1.10 | C1 | 45.4 | 160 | 1.105 | 5 | 3 | 1.04 |
| Example 6 | 1.11 | C1 | 45.4 | 100 | 1.090 | 6 | 5 | 1.06 |
| Comparative Example 1 | 0.54 | — | 45.5 | 132 | 1.096 | 7 | 2 | 1.04 |
| Comparative Example 2 | 1.4 | C1 | 45.4 | 121 | 0.992 | 8 | 4 | 1.03 |
| Comparative Example 3 | 2.8 | C1 | 45.4 | 103 | 0.956 | 9 | 3 | 1.02 |
| Reference Example 1 | 1.09 | C1 | 45.4 | — | 1.043 | 10 | — | — |
| Reference Example 2 | 2.7 | C1 | 45.4 | — | 1.029 | 11 | — | — |

Note
B1: Mass ratio: styrene/styrene macromer/methacrylic acid/M-40G = 44/15/16/25; acid value: 104 mg KOH/g
B2: Mass ratio: styrene/α-methyl styrene/acrylic acid = 54/4/42; acid value: 327 mg KOH/g
B3: Low-molecular dispersant: sodium polyoxyethylenealkylethersulfate: "LATEMUL E-118B"
Note
Crosslinking agent: Trimethylolpropane polyglycidyl ether
*[1] $[(A1_{max})/(A2_{max})]$ From Table 2, it was confirmed that the water-based inks using the pigment water dispersion liquids obtained in Examples 1 to 6 were excellent in ejection stability (intermittent ejection properties) and optical density (printing density) as compared to the water-based inks using the pigment water dispersion liquids obtained in Comparative Examples 1 to 3.

In Reference Examples 1 and 2 in which C.I. Pigment Yellow 74 was used as the pigment, the difference in absorbance ratio between the water-based inks obtained in Reference Examples 1 and 2 was 0.017, whereas the difference in absorbance ratio between the water-based inks obtained in Example 3 and Comparative Example 3 was 0.137 notwithstanding that the same dispersion treatment method was used in Example 3 and Comparative Example 3. For this reason, it was confirmed that among the yellow pigments, the azomethine metal complex pigment had a special effect.

INDUSTRIAL APPLICABILITY

In accordance with the present invention, it is possible to provide a process for producing a pigment water dispersion liquid containing an azomethine metal complex pigment which is capable of providing a water based ink that is excellent in ejection stability and optical density, a pigment water dispersion liquid, and a water-based ink for ink-jet printing containing the pigment water dispersion liquid.

The invention claimed is:
1. A process for producing a pigment water dispersion liquid of polymer particles comprising an azomethine metal complex pigment (A), said process comprising the step of subjecting a mixture comprising the azomethine metal complex pigment (A), an uncrosslinked aromatic group-containing polymer (b) and water to dispersion treatment using a medialess disperser at an accumulated input energy of not more than 5.0 kWh/kg.

2. The process for producing a pigment water dispersion liquid according to claim 1, wherein in an optical absorption spectrum of the pigment water dispersion liquid, a ratio of a maximum absorbance ($A1_{max}$) in a wavelength range of not less than 440 nm and less than 465 nm to a maximum absorbance ($A2_{max}$) in a wavelength range of not less than 420 nm and less than 440 nm [($A1_{max}$)/($A2_{max}$)] is not less than 1.000.

3. The process for producing a pigment water dispersion liquid according to claim 1, wherein the medialess disperser is a high-pressure disperser.

4. The process for producing a pigment water dispersion liquid according to claim 1, further comprising the step of subjecting the aromatic group-containing polymer (b) to crosslinking treatment after the step of conducting the dispersion treatment.

5. The process for producing a pigment water dispersion liquid according to claim 1, wherein the azomethine metal complex pigment (A) is C.I. Pigment Yellow 150.

6. A pigment water dispersion liquid comprising an azomethine metal complex pigment (A) and a polymer dispersant (B), in which in an optical absorption spectrum of the pigment water dispersion liquid, a ratio of a maximum absorbance ($A1_{max}$) in a wavelength range of not less than 440 nm and less than 465 nm to a maximum absorbance ($A2_{max}$) in a wavelength range of not less than 420 nm and less than 440 nm [($A1_{max}$)/($A2_{max}$)] is not less than 1.000.

7. The pigment water dispersion liquid according to claim 6, wherein a polymer of the polymer dispersant (B) is an uncrosslinked aromatic group-containing polymer (b) or a crosslinked aromatic group-containing polymer (B).

8. The pigment water dispersion liquid according to claim 6, wherein the polymer of the polymer dispersant (B) is a polymer obtained by copolymerizing an aromatic group-containing monomer mixture comprising an aromatic group-containing monomer and a carboxy group-containing vinyl monomer.

9. The pigment water dispersion liquid according to claim 6, wherein a mass ratio of the azomethine metal complex pigment (A) to the aromatic group-containing polymer (B) [(A)/(B)] is not less than 1.4 and not more than 4.

10. The pigment water dispersion liquid according to claim 6, wherein the azomethine metal complex pigment (A) is a nickel complex pigment having a structure represented by the following general formula (2) or a pigment of a tautomer thereof:

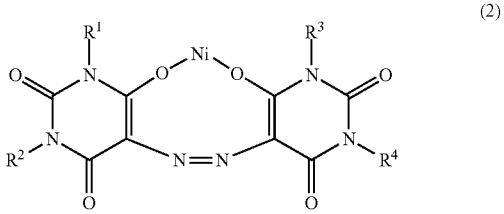

wherein $R^1$ to $R^4$ are each independently a hydrogen atom, a monovalent hydrocarbon group having 1 to 5 carbon atoms, or a —$SO_3H$ group.

11. The pigment water dispersion liquid according to claim 6, wherein the azomethine metal complex pigment (A) is C.I. Pigment Yellow 150.

12. The pigment water dispersion liquid according to claim 6, wherein the azomethine metal complex pigment (A) and the polymer dispersant (B) are present in the form of aromatic group-containing polymer (B) particles comprising the pigment (A).

13. The pigment water dispersion liquid according to claim 12, wherein an average particle size of the aromatic group-containing polymer (B) particles comprising the pigment (A) is not more than 180 nm.

14. A water-based ink for ink-jet printing, comprising the pigment water dispersion liquid according to claim 6.

* * * * *